United States Patent [19]

Beckwith, Jr.

[11] Patent Number: 4,939,678
[45] Date of Patent: Jul. 3, 1990

[54] METHOD FOR CALIBRATION OF COORDINATE MEASURING MACHINE

[75] Inventor: Walter L. Beckwith, Jr., Warwick, R.I.

[73] Assignee: Brown & Sharpe Manufacturing Company, North Kingstown, R.I.

[21] Appl. No.: 193,069

[22] Filed: May 12, 1988

Related U.S. Application Data

[63] Continuation-in-part of Ser. No. 122,771, Nov. 19, 1987, Pat. No. 4,884,889.

[51] Int. Cl.⁵ ............................................. G06F 15/46
[52] U.S. Cl. .................................. 364/571.02; 33/1 M; 33/505; 356/375; 364/474.37; 364/571.01
[58] Field of Search ............... 356/375, 363, 152, 358, 356/356, 353, 239; 364/513, 167.01, 571.01, 571.02, 571.04, 571.05, 474.35, 474.37; 33/1 M, 503, 505, 556, 504; 318/480

[56] References Cited

U.S. PATENT DOCUMENTS

| | | | |
|---|---|---|---|
| 2,924,768 | 2/1960 | Farrand et al. | 318/480 |
| 3,551,055 | 12/1970 | Chitayat | 356/363 |
| 3,622,244 | 11/1971 | Chitayat | 356/363 |
| 3,715,599 | 2/1973 | Marcy | 356/363 |
| 3,765,772 | 10/1973 | Willett | 356/353 |
| 3,790,284 | 2/1974 | Baldwin | 356/233 |
| 3,884,580 | 5/1975 | Webster et al. | 356/358 |
| 4,215,938 | 8/1980 | Farrand et al. | 356/358 |
| 4,261,107 | 4/1981 | Coleman et al. | 33/503 |
| 4,276,698 | 7/1981 | Dore et al. | 33/503 |
| 4,500,200 | 2/1985 | Kleinhans | 356/152 |
| 4,587,622 | 5/1986 | Herzog | 364/571.04 |
| 4,638,232 | 1/1987 | Stridsberg et al. | 364/167.01 |
| 4,642,781 | 2/1987 | Szonyi | 364/571.02 |
| 4,660,981 | 4/1987 | Stridsberg | 356/375 |
| 4,662,752 | 5/1987 | Tucker et al. | 356/375 |
| 4,670,849 | 6/1987 | Okada et al. | 364/167.01 |
| 4,676,649 | 6/1987 | Phillips | 33/1 M |
| 4,758,720 | 7/1988 | Aubele et al. | 356/375 |
| 4,763,276 | 8/1988 | Perreirra et al. | 364/167.01 |
| 4,782,598 | 11/1988 | Guarini | 33/1 M |
| 4,787,747 | 11/1988 | Sommargren et al. | 356/358 |
| 4,819,195 | 4/1989 | Bell et al. | 33/556 |

OTHER PUBLICATIONS

"Calibration of a Machine Tool", Laser Measurement System, Application Note 156-4, Hewlett-Packard.

Primary Examiner—Kevin J. Teska
Attorney, Agent, or Firm—Wolf, Greenfield & Sacks

[57] ABSTRACT

Methods for determining nonrigid error parameters that result from deflection or deformation of machine elements and correcting scale readings in a coordinate measuring machine. The nonrigid error parameters are a function of probe position along two directions. In a bridge type coordinate measuring machine, the y-direction error parameters are a function of probe position in both x and y directions and thus exhibit nonrigid behavior. Nonrigid error parameters are measured by making error measurements at a plurality of corresponding points along two parallel, spaced-apart measurement lines. The error measurements are substituted into simultaneous equations for the error parameters, and the equations are solved for the coefficients. The coefficients are used to determine the axial errors at any point in the measuring volume. The axial errors are subtracted from the scale readings.

11 Claims, 12 Drawing Sheets

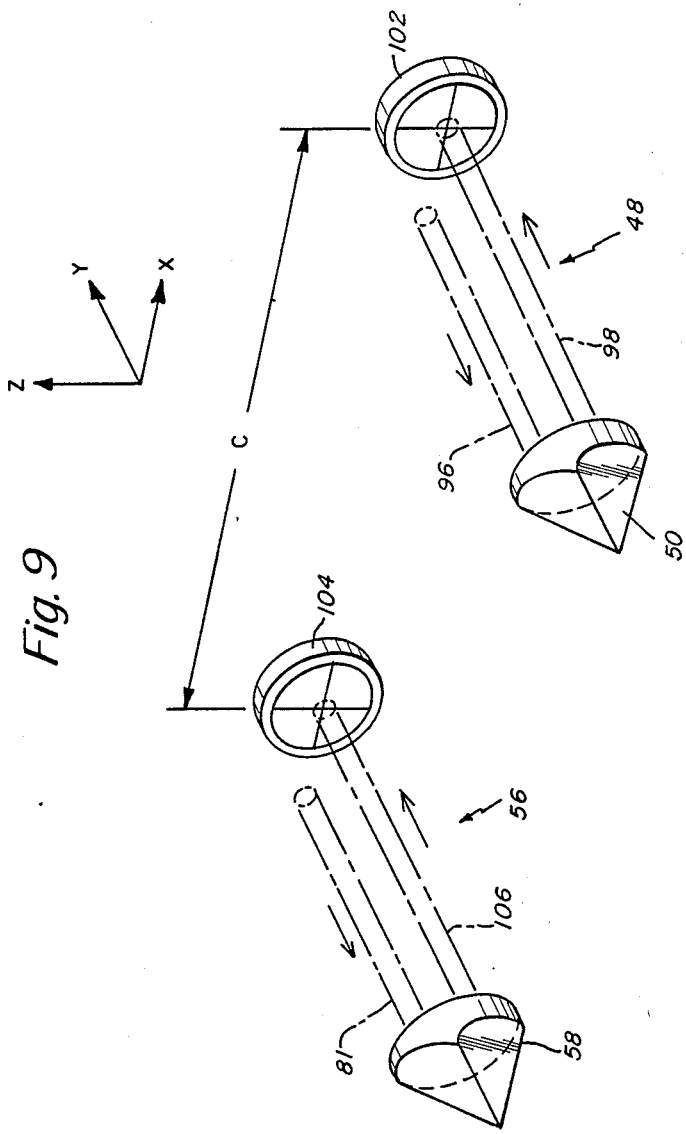

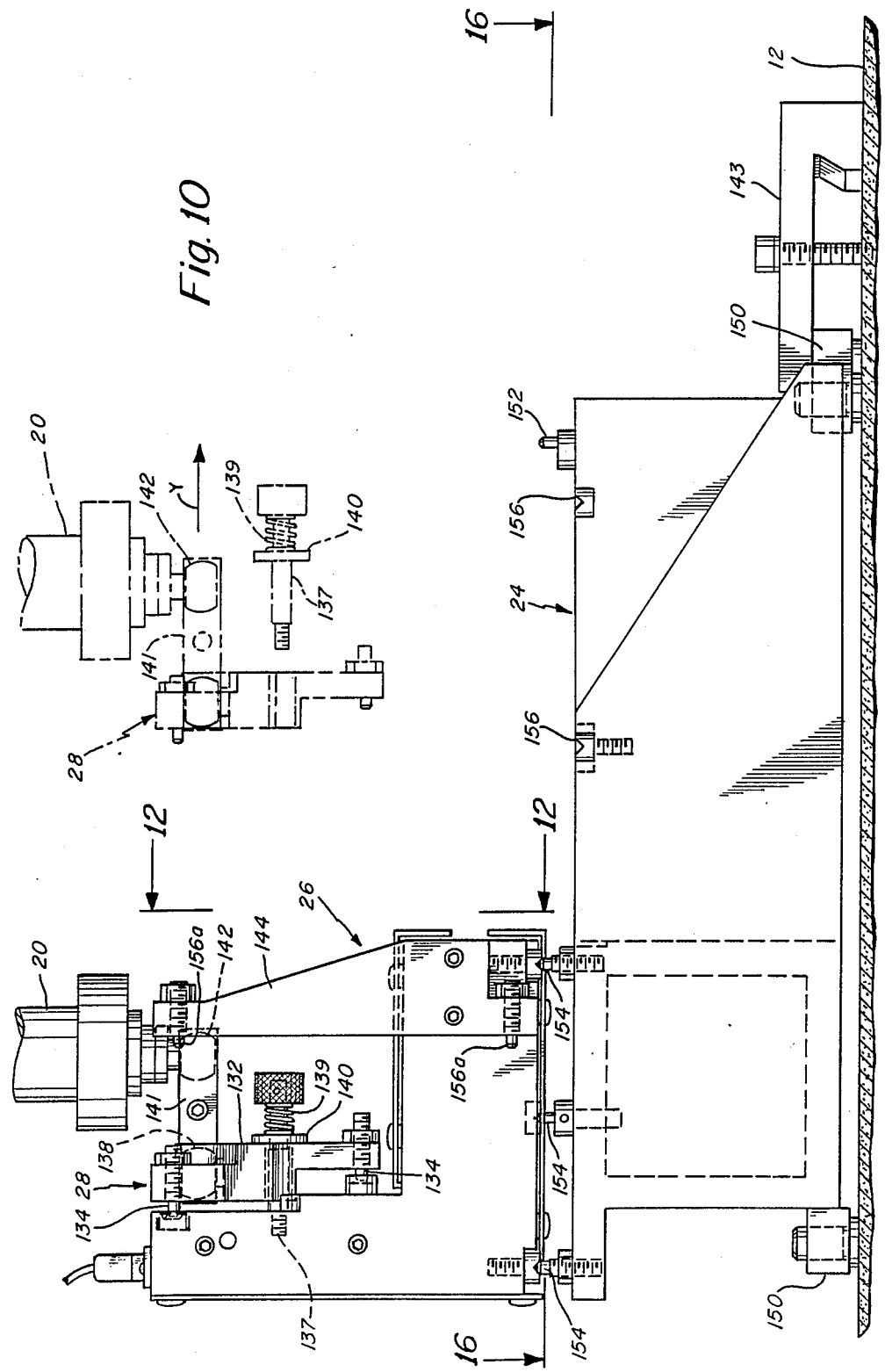

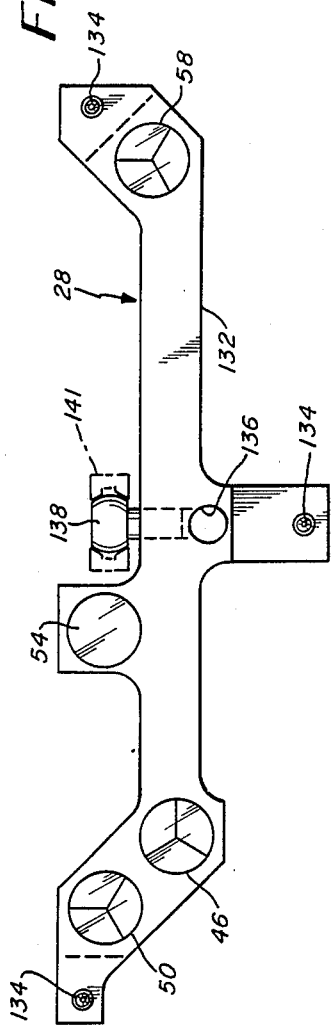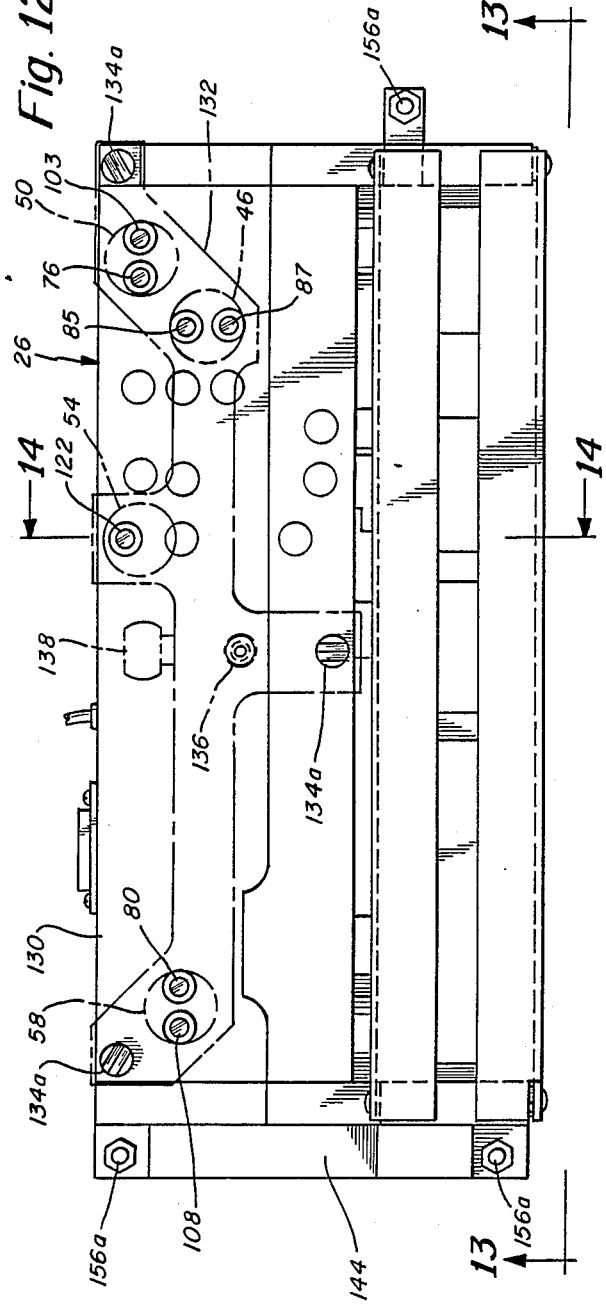

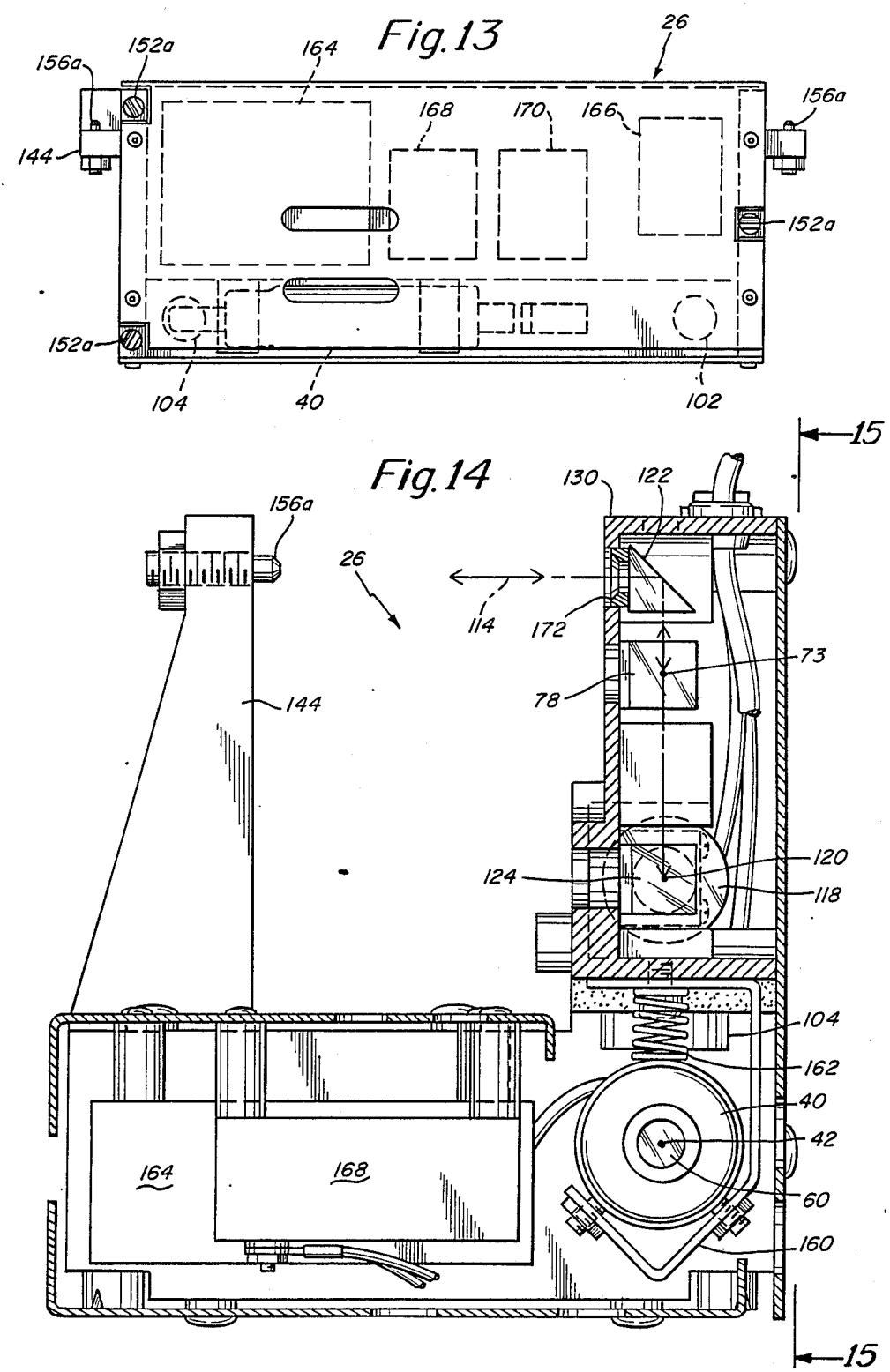

METHOD FOR CALIBRATION OF COORDINATE MEASURING MACHINE

CROSS REFERENCE TO RELATED APPLICATIONS

This application is a continuation-in-part of application Ser. No. 122,771 filed Nov. 19, 1987 now U.S. Pat. No. 4,884,889.

FIELD OF THE INVENTION

This invention relates to coordinate measuring machines and, more particularly, to a method for calibrating coordinate measuring machines to correct for errors that are dependent on the position of a measuring probe. The errors include rigid errors that are a function of probe position along only one direction and nonrigid errors that are a function of probe position in more than one direction.

BACKGROUND OF THE INVENTION

Coordinate measuring machines are used for dimensional inspection of workpieces such as machine parts. A workpiece is secured to a fixed table, and a measuring probe is secured to a vertically movable ram which is also movable in a horizontal plane. To measure the position of a point on the workpiece, the probe is brought into contact with the point and the x, y and z measuring scales of the machine are read. To measure a distance between two points, the points are contacted successively, the coordinates of both points are read and distance is calculated from the coordinates. State of-the art coordinate measuring machines have refinements such as high resolution measuring systems, electrical contact probes, motor drives, computer controlled drives and computer acquisition and processing of data.

The accuracy of a coordinate measuring machine is limited by inaccuracies in the scales or other measuring systems and by faults in the guideways which establish orthogonality of machine motions. One approach to increasing accuracy is simply to improve the construction techniques and reduce tolerances of the system so that errors are reduced. However, the reduction of errors becomes progressively more expensive as required accuracies increase. Another approach is direct measurement of x, y and z errors at points throughout the machine working volume. This approach is impractical because of the huge amounts of data which must be stored for large machines and because of the time required to measure such data. A third approach is the measurements of errors in parametric form. That is, sets of error parameters are measured, for example, along three mutually orthogonal axes and stored for future use. The x, y and z errors at any point in the measurement volume are calculated from the parametric errors. The calculated errors are then subtracted from the scale readings to determine actual workpiece coordinates.

The coordinate measuring machine has three sets of guideways which establish probe motion. Ideally, movement along each of these guideways should result only in linear motion and the scale reading would equal the linear displacement. In reality, however, there are scale errors and the guideways are not completely straight or perfectly free from twist. For a real machine, there are six degrees of freedom which produce errors during movement along each guideway. For each direction of movement, there are three linear errors, $D_x$, $D_y$ and $D_z$ and three rotational errors, $D_x$, $D_y$ and $D_z$ and three rotational errors, $A_x$, $A_y$ and $A_z$. These six error parameters can be measured at a number of points along each direction of machine movement, resulting in an error matrix with 18 error parameters. From the matrix of 18 error parameters, the error at any point in the measurement volume can be calculated.

Various techniques have been used for the measurement of parametric errors. Laser interferometer techniques are well known for measuring displacement errors with high accuracy. Dual frequency interferometer techniques have also been utilized for measurement of straightness and roll as disclosed in U.S. Pat. No. 3,790,284, issued Feb. 5, 1974 to Baldwin. A system utilizing partitioned photocells to detect pitch and yaw of a stage is disclosed in U.S. Pat. No. 3,715,599 issued Feb. 6, 1973 to Marcy. A four quadrant angular movement sensor is disclosed in U.S. Pat. No. 3,765,772 issued Oct. 16, 1973 to Willett. One prior art approach to measurement of parametric errors utilizes a Hewlett-Packard 5526A laser measuring system, which is described in "Calibration of a Machine Tool," Hewlett-Packard Laser Measurement System Application Note 156-4. The system is transportable between machines but the machine calibration time is about 40 hours. In addition, a different setup is needed for each measurement and setup errors are difficult to avoid. A system for measuring the six error parameters along each axis of motion of a measuring machine is disclosed in U.S. Pat. No. 4,261,107, issued Apr. 14, 1981 to Coleman et al. The system utilizes interferometric techniques for measuring each of the error parameters and requires a dual frequency laser to measure displacements perpendicular to the laser beam axis. As a result, the system is complex and expensive. Furthermore, different fixed measurement arrangements are utilized for each of the three axes of motion of the machine, thereby further adding to the complexity and cost of the system.

In the measurement of error parameters for a coordinate measuring machine, the machine elements are normally assumed to be rigid bodies that do not undergo deflections, or deformations, as the probe is moved. A careful analysis, however, reveals that certain elements of the machine deflect as a function of probe position.

A bridge coordinate measuring machine includes y-guideways for support of the bridge. The y-guideways are typically supported at each end, and thus are deflected downwardly by the weight of the bridge. The bridge carries the x-carriage and the z-ram, with the probe attached to its lower end. The deflection of each y-guideway depends both on the position of the bridge and the position of the x-carriage on the bridge. When the x-carriage is closer to one end, the y-guideway on that end is deflected more.

Nonrigid behavior is also exhibited by other types of coordinate measuring machines. In a horizontal arm machine, a horizontal ram is supported by a z-carriage on a z-rail. The z-rail is deflected from vertical depending on both the position of the z-carriage and the distance by which the arm is extended.

It is a general object of the present invention to provide improved methods for calibrating coordinate measuring machines.

It is another object of the present invention to provide methods for calibrating coordinate measuring machines that compensate for nonrigid behavior of machine elements.

It is a further object of the present invention to provide methods for calibrating the position of a movable element relative to a fixed element in a machine which is deformable.

It is another object of the present invention to provide methods for coordinate measuring machine calibration wherein nonrigid error parameters are determined from error measurements along parallel, spaced-apart measurment lines.

It is yet another object of the present invention to provide methods for calibrating coordinate measuring machines with high accuracy.

SUMMARY OF THE INVENTION

According to the present invention, these and other objects and advantages are achieved in a method for determining error parameters for correction of measuring system readings in a machine such as a coordinate measuring machine. The machine includes a first element movable in prescribed movement directions relative to a second element, and a measuring system for monitoring the position of the first element in the prescribed movement directions and providing measuring system readings. Both rigid error parameters and nonrigid error parameters for correction of the scale readings are measured. The error parameters are measured along measurement directions parallel to the prescribed movement directions. Rigid error parameters are those which are a function only of the position of the first element relative to the second element along a prescribed measurement direction. Nonrigid errors are those that are a function of the position of the first element relative to the second element along a prescribed measurement direction and a function of the position of the first element relative to the second element along a second direction, usually perpendicular to the measurement direction. Nonrigid error parameters thus account for machine deflection, or deformation, that occurs during movement of the first element relative to the second element. In a typical coordinate measuring machine, the first element is a probe attached to a ram, and the second element is a table for holding a workpiece.

Each rigid error parameter is measured at points along a single line parallel to the measurement direction. Each nonrigid error parameter is measured at corresponding sets of n points along n spaced-apart lines parallel to the measurement direction, each set of n points lying on a line parallel to the second direction, to provide sets of nonrigid error parameter measurements. Each set of nonrigid error parameter measurements and the corresponding first element positions are substituted into an equation having n coefficients describing the relationship between the nonrigid error parameter and the first element position along the second direction to provide n simultaneous equations. The n simultaneous equations corresponding to each set of nonrigid error parameters are solved for the n coefficients. The rigid error parameters and the sets of n coefficients are saved for subsequent correction of the scale readings.

Preferably, the step of measuring each nonrigid error parameter includes the steps of positioning the first element at a plurality of points along a first line parallel to the measurement direction and measuring the nonrigid error parameter at each such point, shifting the first element in the second direction to a second line parallel to the measurement direction, and positioning the first element at a like plurality of points along the second line and measuring the nonrigid error parameter at each such point.

The step of measuring each nonrigid error parameter preferably includes the steps of attaching a first measuring device to the first element, attaching a second measuring device to the second element and directing at least one laser beam between the first and second measuring devices for determining the position of the first element relative to the second element. In a preferred embodiment, the method further includes the step of offsetting the first measuring device from the first element during measurement of the nonrigid error parameters along one of the lines so that the second measuring device can remain in a fixed position on the second element.

According to another aspect of the invention, there is provided a method for correcting errors in measuring system readings in a machine including a first element and a second element which are movable relative to each other, and a measuring system for monitoring the relative positions of the first element and the second element and providing the measuring system readings. The method comprises the steps of determining nonrigid error parameters that are a function of the position of the first element relative to the second element along two directions, using the nonrigid error parameters to calculate axial errors in the measuring system readings, and subtracting the axial errors from the measuring system readings. Thus, the measuring system readings are corrected for errors resulting from deformation of machine elements.

BRIEF DESCRIPTION OF THE DRAWINGS

For a better understanding of the present invention together with other and further objects, advantages and capabilities thereof, reference is made to the accompanying drawings which are incorporated herein by reference and in which:

FIG. 9 is a simplified schematic diagram of the optics used in the calibration system for measuring roll;

FIG. 10 is a side elevation view of the laser measuring assembly, the reflector assembly and the fixture on which the laser measuring assembly is mounted, with the reflector assembly shown in phantom displaced along the y-axis;

FIG. 11 is a front elevation view of the reflector assembly;

FIG. 12 is a front elevation view of the laser measuring assembly taken along the line 12—12 of FIG. 10, with the reflector assembly shown in phantom;

FIG. 13 is a bottom view of the laser measuring assembly taken along the line 13—13 of FIG. 12;

FIG. 14 is a cross-sectional view of the laser measuring assembly taken along the line 14—14 of FIG. 12;

DETAILED DESCRIPTION OF THE INVENTION

Figure 1:
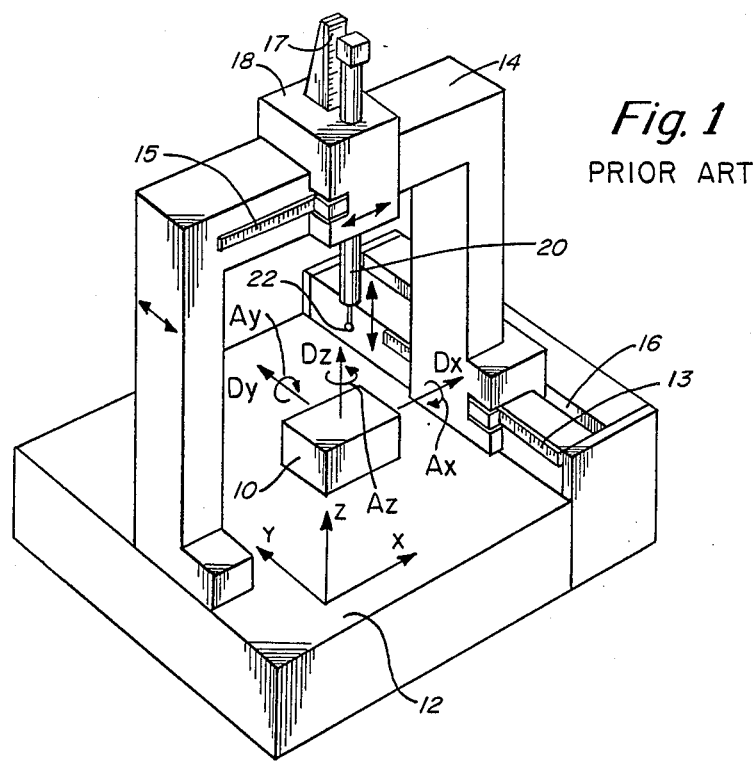
FIG. 1 is a perspective view of a coordinate measuring machine in accordance with the prior art.

A prior art moving bridge coordinate measuring machine is shown schematically in FIG. 1. The machine is intended for measurement of a workpiece 10 which is mounted on a fixed machine table 12. The x, y, and z axes of the machine are illustrated. A bridge 14 moves in the y direction along guideway 16 on the table 12. A carriage 18 moves in the x direction along guideways on the bridge 14. A ram 20 with a probe 22 mounted to its lower end moves vertically through bearings in the carriage 18. Scale systems between the bridge 14 and the table 12, between the carriage 18 and the bridge 14, and between the ram 20 and the carriage 18 indicate the positions of the movable elements in the three axial directions. To measure the coordinates of a point on the workpiece 10, probe 22 is brought into contact with the point. The probe 22 senses contact and causes a system computer to read and store the readings on the three scale systems. An example of a moving bridge coordinate measuring machine is the Model 7101-2418 manufactured by Brown and Sharpe Manufacturing Co. The calibration system described herein can be used with most prior art coordinate measuring machines.

Errors are introduced into the scale readings by inaccuracies in the scale systems and by imperfections in the guideways along which each machine element travels. Each machine element is subject to errors having six components as it travels in a prescribed direction. The six error components are described with reference to movement of the bridge 14 in the y direction. Six error components are also associated with movement of the carriage 18 in the x direction and with movement of the ram 20 in the z direction. The first error component is a displacement error Dy along the direction of movement, the y direction. X direction and z direction displacement errors Dx and Dz are commonly known as straightness errors since they result from guideways which are not perfectly straight. The remaining error components are rotational. Rotation of the bridge 14 about the y axis is commonly known as roll Ay. Rotations of the bridge 14 about the x and z axes are commonly known as pitch Ax and yaw Az, respectively. A complete characterization of the machine with parametric errors requires measurement of the six error components at selected locations along each direction of movement, resulting in an error matrix having 18 columns. The total error at an arbitrary point in the measurement volume is calculated from the parametric errors as described hereinafter.

Figure 2:
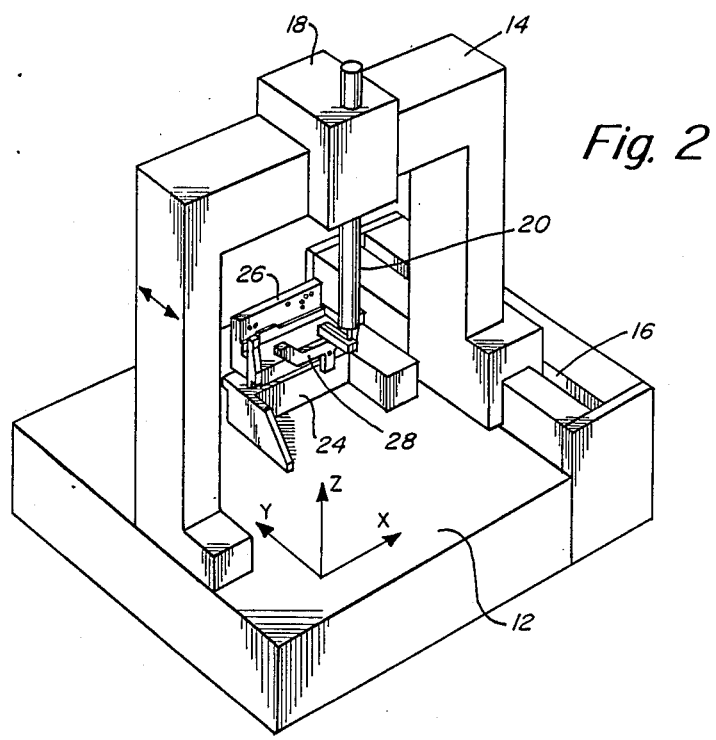
FIG. 2 is a perspective view of a coordinate measuring machine having a calibration system mounted for y-axis calibration.

The calibration system described herein provides apparatus attachable to the coordinate measuring machine for measurement of the 18 error components. A method for performing the error measurements is also described. As shown in FIG. 2, the calibration apparatus includes a mounting fixture 24 which is mounted in a fixed position on the table 12. The apparatus further includes a laser-measuring assembly 26 attachable to the mounting fixture 24 in three different orientations. The calibration apparatus further includes a reflector assembly 28 attachable to the ram 20 in three different orientations.

In each of the three orientations, the laser measuring assembly 26 directs several laser beams at the reflector assembly 28. The measuring assembly 26 and the reflector assembly 28 are aligned in each of the three orientations so that the laser beams are reflected back to the measuring assembly 26 and are sensed. In each of the three orientations, the laser beams generated by the measuring assembly 26 are parallel to one of the directions of movement. In the orientation shown in FIG. 2, the measuring assembly 26 and the reflector assembly 28 are aligned such that the laser beams remain in alignment with the elements of the reflector assembly 28 as the bridge 14 is moved in the y direction. In the orientation shown in FIG. 3, the measuring assembly 26 and the reflector assembly 28 are aligned such that the laser beams remain in alignment with the reflector assembly 28 as the ram 20 is moved in the z direction. Similarly, in the orientation shown in FIG. 4, the measuring assembly 26 and reflector assembly 28 are aligned such that the laser beams remain in alignment with the reflector assembly 28 as the carriage 18 is moved in the x direction.

Calibration of a coordinate measuring machine starts with mounting of the mounting fixture 24 on the table 12 of the machine as shown in FIG. 2. The fixture 24 is placed in a predetermined position, is aligned with the machine axes, and is clamped in place. The laser measuring head 26 is placed on locators on top of the fixture 24 oriented for y axis measurements. Reflector assembly 28 is engaged with locators on the measuring assembly 26 and secured with a mounting screw. The ram 20 is moved to a start position and is clamped to the reflector assembly 28. The carriage 18 and the ram 20 are locked to their guideways. The mounting screw is removed and the bridge 14 is moved in the y direction to selected calibration positions. The spacing and number of the calibration positions depends on the size of the machine and the expected rate of change of errors. A typical spacing of calibration positions is about one inch. For each position, the outputs of the laser measuring assembly 26 and the scale systems of the coordinate measuring machine are read by a calibration computer 30. These outputs are processed to determine y axis parametric errors.

Figure 3:
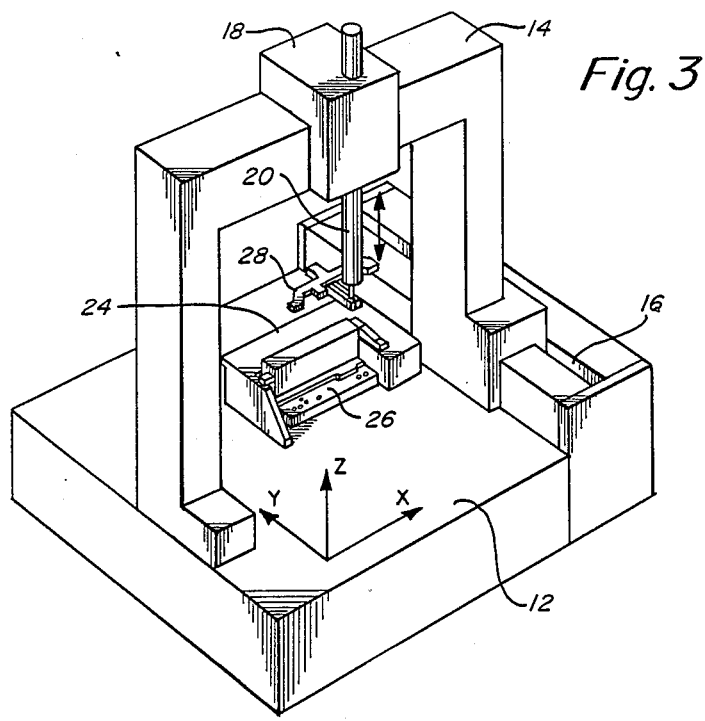
FIG. 3 is a perspective view of a coordinate measuring machine having the calibration system mounted for z-axis calibration.

For z axis error measurements, the laser assembly 26 is placed on locators on top of the fixture 24 which are oriented for z direction measurements as shown in FIG. 3. The reflector assembly 28 is engaged with locators on the measuring assembly 26 and is secured with a mounting screw. The ram 20 is moved to the start position and clamped to the reflector assembly 28. The bridge 14 and the carriage 18 are locked in their guideways. The mounting screw is removed and the ram 20 is moved in the z direction to selected calibration positions. The z axis parametric errors are measured in a manner similar to the measurement of y axis errors described above.

Figure 4:
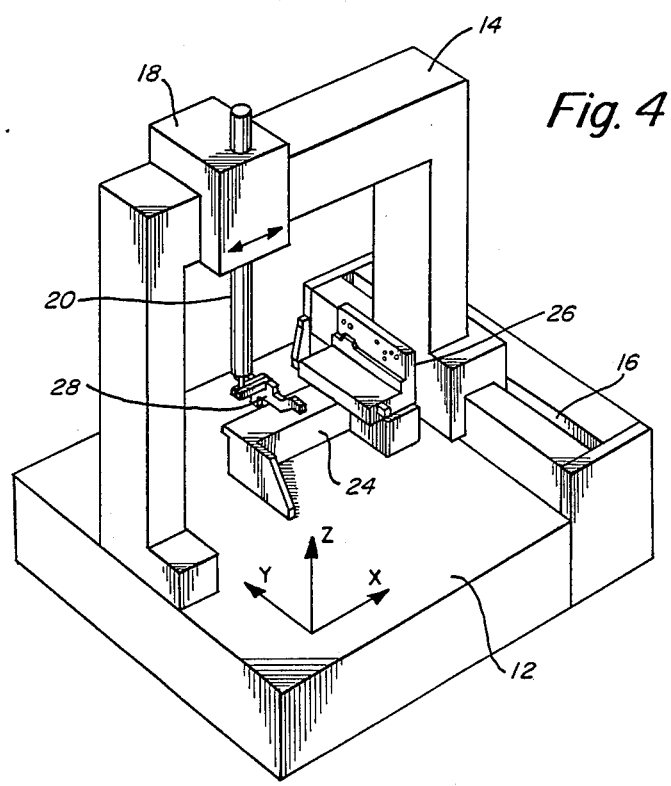
FIG. 4 is a perspective view of a coordinate measuring machine having the calibration system mounted for x-axis calibration.

For x axis error measurement, laser measuring assembly 26 is placed on locators on top of the fixture 24 which are oriented for x direction measurements as shown in FIG. 4. The reflector assembly 28 is engaged with locators on the measuring assembly 26 and is secured with the mounting screw. The ram 20 is moved to a start position and is clamped to the reflector assembly 28. The bridge 14 and the ram 20 are locked to their guideways. The mounting screw is removed and the carriage 18 is moved in the x direction to selected calibration positions. The x axis parametric errors are measured in a manner similar to the measurement of y axis errors as described above.

The calibration computer 30 processes the error matrix to a standard form and stores it on a computer disk. When the coordinate measuring machine is used to measure workpieces, the machine computer loads the error matrix from the disk. When coordinates of a point on the workpiece are measured, the machine retrieves the corresponding parametric errors from the matrix, calculates x, y and z errors, and subtracts them as corrections.

Figure 5:
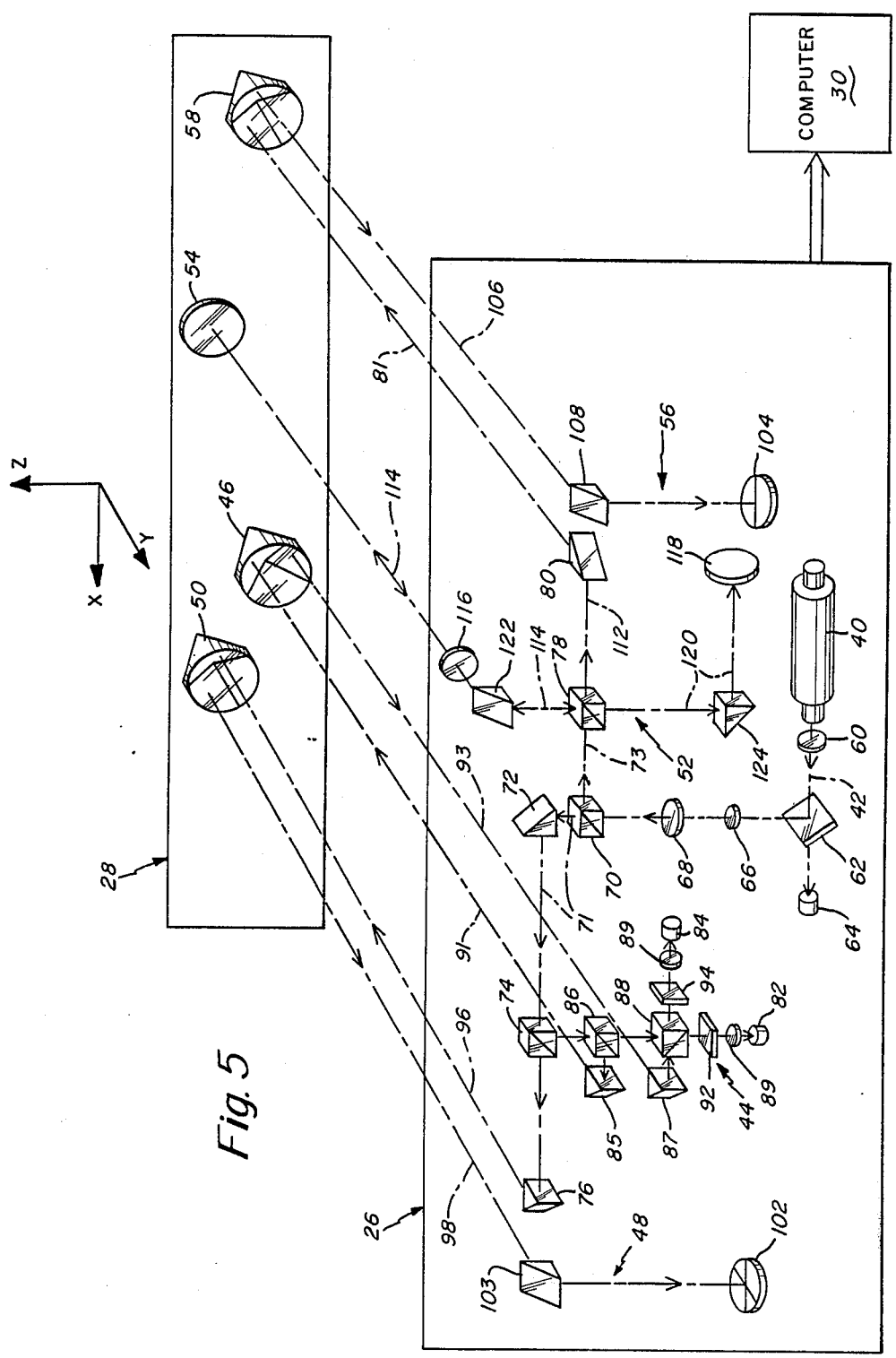
FIG. 5 is a perspective schematic view of the optics of the calibration system.

A schematic optical diagram of the laser measuring assembly 26 and the reflector assembly 28 is shown in FIG. 5. A laser 40 mounted within the measuring assembly 26 supplies a laser beam 42, which is split several times to provide the beams required for measurement of the six parametric errors. A portion of the laser beam 42 is supplied to a displacement error measuring means 44, which, in conjunction with a retroreflector 46 mounted on the reflector assembly 28, measures actual displacement of the reflector assembly 28 relative to the measuring assembly 26. A straightness measuring means 48 in the measuring assembly 26, in conjunction with a retroreflector 50 on the reflector assembly 28, measures straightness deviations Dx and Dz of the reflector assembly 28 in the x and z directions as it is moved in the y direction. A pitch and yaw measuring means 52 in the measuring assembly 26, in conjunction with a mirror 54 on the reflector assembly 28, measures rotations Ax and Az of the reflector assembly 28 about the x and z axes, respectively. A second straightness measuring means 56 in the measuring assembly 26 and a retroreflector 58 mounted on the reflector assembly 28, are used in combination with the first straightness measuring means 48 and retroreflector 50 to measure rotation or roll Ay of the reflector assembly 28 about the y axis. The measuring devices shown in FIG. 5 are described with reference to FIGS. 6-9 which illustrate the measuring means in simplified form for ease of understanding.

In a preferred embodiment, the laser 40 emits beam 42 with a single wavelength. In one example of the present invention, the laser plasma tube is a Melles Griot Model 05 LHP 900 helium neon laser. As the laser cavity length increases during warmup, resonance alternates between a desirable single wavelength mode and an undesirable double wavelength mode. The output of the laser 40 is stabilized in the single wavelength mode using heaters in proximity to the laser tube. The heaters are controlled by sensing the output beam of laser 40.

The laser 40 has a Brewster angle window in its cavity which fixes the plane of polarization of the beam 42. The beam 42 passes through a quarter wave retarder 60 which is set with its optic axis at 45° to the plane of polarization of the laser 40 output. A small portion of the laser beam is separated from the main beam 42 by a partially silvered mirror 62 and is sensed by a photosensor 64. The output signal from the photosensor 64 controls the laser cavity heaters since the output power of the laser is a known function of the degree to which the desirable single wavelength mode is achieved.

A lens 66 spreads the main beam reflected by the mirror 62, and a lens 68 downstream of lens 66 collimates the beam. This arrangement reduces dispersion of the beam over long distances. A beam splitter 70, splits the beam from the lens 68 into two branches, a first branch 71 directed by a prism 72 to the displacement measuring means 44 and to the straightness measuring means 48, and a second branch 73 directed to the pitch and yaw measuring means 52 and to the second straightness measuring means 56. A beam splitter 74, directs part of the first branch 71 from the prism 72 to the displacement measuring means 44. The beam which passes through the beam splitter 74, is directed by a prism 76 to retroreflector 50 and is reflected to the straightness measuring means 48. A beam splitter 78 directs part of the second branch 73 from the beam splitter 70 to mirror 54. The reflected beam from mirror 54 goes to the pitch and yaw measuring means 52. The beam which passes through the beam splitter 78 is directed by a prism 80 as beam 81 to retroreflector 58 and is reflected to the second straightness measuring means 56.

Linear displacement errors in the parametric error matrix are the differences between scale readings and laser distance measurements. Laser distance measurements are made with an interferometer. The preferred interferometer uses a single frequency laser with circular polarization as described hereinafter. However, any type of distance measuring interferometer can be used.

In a distance measuring interferometer, the laser beam is split into two parts, a measuring beam and a reference beam. The length of the measuring beam path changes as distance to be measured changes. The length of the reference beam path is fixed. The two beams are reflected and combined. If they combine in phase, they reinforce and form a bright fringe. If the beams combine out of phase, they cancel and form a dark fringe. The number of changes between light and dark fringes are counted as a measure of distance.

Figure 6:
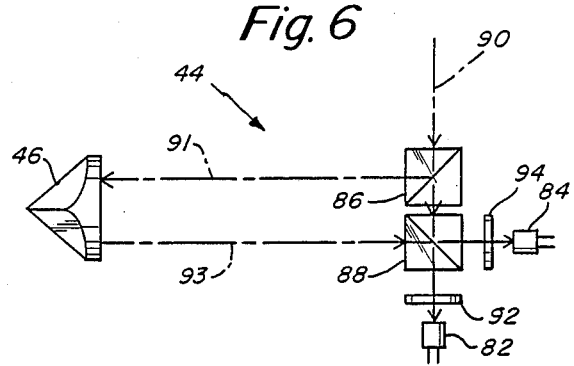
FIG. 6 is a simplified schematic diagram of the interferometer used in the calibration system for measuring displacement errors.
Figure 7:
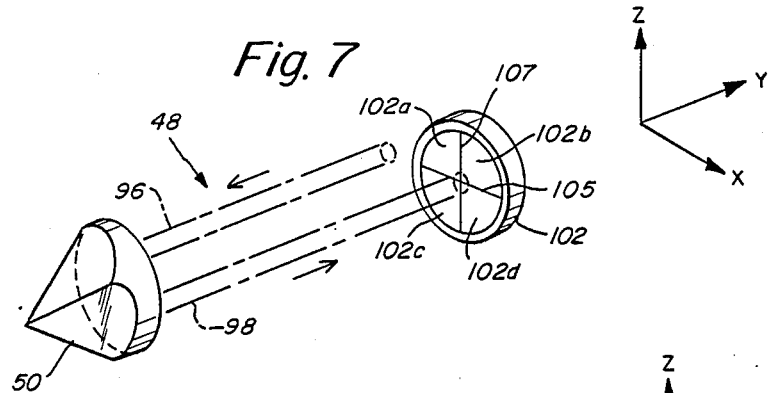
FIG. 7 is a simplified schematic diagram of the optics used in the calibration system for measuring straightness.
Figure 8:
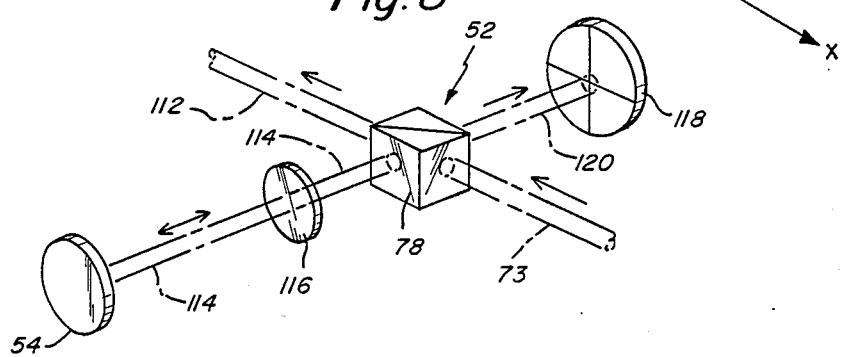
FIG. 8 is a simplified schematic diagram of the optics used in the calibration system for measuring pitch and yaw.

The preferred interferometer for distance measurement is shown in simplified form in FIG. 6. Two fringe patterns are produced, one at a photosensor 82, and one at a photosensor 84. Beam splitters 86 and 88 are each made up of two 90° prisms cemented together, one prism being coated at the joint with a partially reflective coating. The coating is a hybrid metal dielectric which has negligible effect on polarization. The incoming beam 90 from beam splitter 74 is split into two parts by beam splitter 86, a first part going to beam splitter 88 and a second part 91 going to retroreflector 46. The beam from beam splitter 86 is split into two parts by beam splitter 88, a first part going to photosensor 82 and a second part going to photosensor 84. A return beam 93 reflected by the retroreflector 46 is split into two parts, a first part going to photosensor 82 and a second part going to photosensor 84. Retroreflector 46 is located in the reflector assembly 28 and moves with the machine ram 20. The other components shown in FIG. 6 are located in the laser measuring assembly 26.

The fixed length reference beam for photosensor 82 is from beam splitter 86 straight through beam splitter 88 to sensor 82. The variable length measuring beam is from the beam splitter 86 to retroreflector 46, reflected back to beam splitter 88 and reflected by beam splitter 88 to photosensor 82. The fixed length reference beam for the photosensor 84 is from the beam splitter 86 and reflected by beam splitter 88 to the sensor 84. The variable length measuring beam for photosensor 84 is from beam splitter 86 to retroreflector 46, reflected by retroreflector 46 to beam splitter 88 and straight through beam splitter 88 to the sensor 84.

The retroreflector 46 is preferably a prism corner cube which can be considered a corner cut off a glass cube. Light beam 91 entering from beam splitter 86 is reflected three times from the back faces of the corner cube and is returned as beam 93 parallel to its incident path to beam splitter 88.

A characteristic of circularly polarized light is that its hand is reversed whenever it is reflected. The reference beam to photosensor 82 has no reflections, while the measuring beam is reflected five times. Thus, the two beams at the photosensor 82 have polarizations of opposite hand. The reference beam to photosensor 84 is reflected once while the measuring beam is reflected four times. Thus, the two beams at the photosensor 84 also have polarizations of opposite hand. When two circularly polarized beams of opposite hand are combined, they form a single plane polarized beam. The plane of polarization depends on the phase relationship between the beams.

As retroreflector 46 moves and the measuring path length of the beam to photosensor 82 changes, the phase relationship changes. This causes the plane of polarization to rotate about the beam path. A polarizing filter 92 is placed between beam splitter 88 and photosensor 82. As the plane of polarization rotates, it aligns with the axis of the filter 92 twice per revolution, and light passes through to the photosensor 82. Also, twice per revolution the plane of polarization is perpendicular to the axis of the filter 92 and all light is blocked. Thus, photosensor 82 sees alternate light and dark fringes as retroreflector 46 moves. A polarizing filter 94 is placed in front of photosensor 84 and causes the same effect.

The electrical outputs of photosensors 82 and 84 are proportional to the amount of light striking them. When retroreflector 46 moves at constant speed, the outputs are sinusoidal. The axes of polarizing filters 92 and 94 are oriented so that the two sinusoidal signals from photosensors 82 and 84 are in quadrature, that is, so that one leads the other by one quarter cycle. When the retroreflector 46 moves in one direction, the output of one photosensor leads the other by 90°. When the retroreflector 46 moves in the opposite direction, the output of the same photosensor lags the other by 90°. This characteristic is used to determine the direction of the movement. The number of cycles from each photosensor indicates the distance moved and is accumulated in a counter, while the phase relationship between the two outputs indicates the direction of movement.

With reference to FIG. 5, the displacement measuring means 44 further includes a prism 85 which directs the beam 91 from the beam splitter 86 to the retroreflector 46 and a prism 87 which directs the reflected beam 93 from the retroreflector 46 to the beam splitter 88. These prisms permit a more compact design. Also shown in FIG. 5 are optional lenses 89 between polarizing filter 92 and photosensor 82 and between polarizing filter 94 and photosensor 84. The lenses 89 focus light on the photosensors 82, 84 and increase the output signal.

Straightness is a linear error in a direction perpendicular to the intended direction of motion. For each calibration point along the direction of movement, there are two straightness errors in directions perpendicular to each other. The straightness measuring means 48 and the retroreflector 50 are illustrated in simplified form in FIG. 7. A laser beam 96 in the direction for which straightnesses are being measured is reflected by retroreflector 50 on reflector assembly 28 back along a parallel path as beam 98 to a four quadrant photodetector 102 in laser measuring assembly 26.

The retroreflector 50 is a corner cube or a cat's eye which has two characteristics important to straightness measurement. The first is that the beams 96 and 98 are parallel regardless of angular errors in positioning the retroreflector. This means that machine rotational errors do not affect straightness measurements. The second characteristic is that beams 96 and 98 when viewed along the y axis are symmetrical with respect to the vertex of the retroreflector.

For y axis straightness measurement, the four quadrant photodetector 102 is located so that when the bridge 14 is at y=0, the beam 98 is centered with respect to perpendicular dividing lines 105 and 107. For another y position, let there be a vertical straightness error Dz. This error moves reflector assembly 28 and the vertex of retroreflector 50 a vertical distance Dz. Because of the above-noted symmetry, return beam 98 moves vertically by 2Dz. Thus, the beam 98 strikes photodetector 102 displaced vertically 2Dz from horizontal dividing line 105. Similarly, when there is a horizontal straightness error Dx, the vertex of corner cube 50 moves horizontally by Dx. Return beam 98 moves horizontally 2Dx and is displaced horizontally 2Dx from vertical dividing line 107. The four quadrant photodetector 102 is made up of four photodiodes 102a, 102b, 102c and 102d separated by dividing lines 105 and 107. Each photodiode has an electrical output proportional to the light striking it. For measurement of vertical straightness Dz, the sum of outputs from photodiodes 102c and 102d is subtracted from the sum of the outputs from photodiodes 102a and 102b. The result is divided by the sum from all four photodiodes to remove the effects of variation in beam intensity. The result is multiplied by a constant to convert to conventional length units. Similarly, horizontal straightness Dx is determined by subtracting the sum of outputs from photodiodes 102b and 102d from the sum of outputs from photodiodes 102a and 102c and dividing the result by the sum of outputs from all four photodiodes.

With reference to FIG. 5, it is noted that the straightness measuring means includes a prism 103 which redirects the reflected beam 98 from the retroreflector 50 to photosensor 102. The prism 103 permits a more compact design.

Roll is rotational error about the axis of movement. Again considering movement along the y axis, data for determining roll error is measured by making two measurements of vertical straightness Dz along two lines spaced apart in the x direction. With reference to FIG. 5, one vertical straightness measurement is taken by first straightness measuring means 48 and retroreflector 50, while a second straightness measurement is taken by second straightness measuring means 56 and retroreflector 58. Roll measurement is illustrated in simplified form in FIG. 9. In first straightness measuring means 48, vertical straightness $Dz_1$ is determined by photodetector 102 which detects vertical deviations of return beam 98 as described above. Similarly, in second straightness measuring means 56, a photodetector 104 senses vertical straightness $Dz_2$ by sensing vertical deviations of a reflected beam 106 from retroreflector 58. In measuring roll only vertical displacements are of interest. Therefore, the photodetector 104 requires only two photodiodes. (The photodetector 102 requires four quadrants since it is also used for straightness measurements.) Alternatively, the upper two photodiodes and the lower two photodiodes of a four quadrant photodetector may be wired together for photodetector 104. For each calibration position, roll measured in radians is calculated by subtracting the two vertical straightness measurements and dividing by the distance C between the first and second straightness measuring means 48, 56. Thus, roll = $(Dz_2 - Dz_1)/C$.

With reference to FIG. 5, the second straightness measuring means 56 includes a prism 108 which directs the beam 106 from retroreflector 58 to photodetector 104.

Yaw and pitch are rotational errors about axial directions perpendicular to the axis of motion. For horizontal (x and y) calibration, yaw is rotation about a vertical axis and pitch is rotation about a horizontal axis. For vertical (z) calibration, yaw is defined as rotation about a y direction line and pitch is rotation about a x direction line. The pitch and yaw measuring means 52 is shown in simplified form in FIG. 8. Incoming laser beam 73 is split by beam splitter 78. A transmitted beam 112 passes through the splitter 78 and is used for roll measurement as described hereinabove. A reflected beam 114 passes through a quarter wave plate 116 to mirror 54 on reflector assembly 28. The beam 114 is reflected back on itself through the quarter wave plate 116 and beam splitter 78 to a four quadrant photodetector 118.

Incoming beam 73 is circularly polarized. Beam splitter 78 has an all dielectric partial reflection coating which has a strong effect on polarization. The result is that transmitted beam 112 is substantially horizontally polarized and reflected beam 114 is vertically polarized.

Quarter wave plate 116 is oriented with its axis at 45° to the plane of polarization of the reflected beam 114 and converts the beam 114 back to circular polarization. Reflection from mirror 54 reverses the hand of the polarization. The return beam in passing back through the quarterwave plate 116 is reconverted back to plane polarization but, due to the change of hand at the mirror 54, the polarization is now in the horizontal plane. Polarizing beam splitter 78 passes the entire reflected beam through to photodetector 118.

There are two reasons for this complex maneuver with polarization. First, it insures that all the light is used. If beam splitter 78 were nonpolarizing, half the return beam from the mirror 54 would be reflected back along the path of beam 73. Second, it prevents spurious reflections from quarter wave plate 116 and from the measurement means 56 from reaching the photodetector 118. Reflections from the quarter wave plate 116, being vertically polarized, are reflected back along the path of beam 73. Reflections from the second straightness measuring means 56 are horizontally polarized and pass through the beam splitter 78 along the path of beam 73.

For performing y axis pitch and yaw measurements, the photodetector 118 is located so that reflected beam 120 is centered when the bridge 14 is at y=0. For another calibration position with a yaw error Az, plane mirror 54 rotates by Az about the vertical z axis. From the laws of reflection this causes an angle 2Az between the incident and reflected beams, and reflected beam 120 is displaced horizontally on photodetector 118. The amount of displacement is determined in the same manner as for straightness. Yaw Az in radians is calculated as half the displacement at photodetector 118 divided by the distance from mirror 54 to photodetector 118. This distance is a fixed distance determined when the bridge 14 is at y=0 plus the distance of travel to the calibration point. In the case of pitch Ax, the mirror 54 rotates about a horizontal x axis. Similarly to the case of yaw, this causes an angle 2Ax between the incident and reflected beams, and reflected beam 120 is displaced vertically on photodetector 118. Pitch Ax in radians is calculated as half the displacement at photodetector 118 divided by the distance from the mirror 54 to the photodetector 118.

With reference to FIG. 5, the pitch and yaw measurement means 52 further includes a prism 122 which directs beam 114 from beam splitter 78 to quarter wave plate 116, and a prism 124 which directs reflected beam 120 from beam splitter 78 to photodetector 118.

A preferred embodiment of the calibration system is illustrated in FIGS. 10-17. The elements of the laser measuring assembly 26 shown in FIG. 5 are contained within a housing 130 having a generally L-shaped cross-section. The laser measuring assembly 26 is adapted for attachment to mounting fixture 24 in three different orientations as described hereinafter.

The reflector assembly 28, as best shown in FIG. 11, includes a support bracket 132 that provides rigid support for retroreflectors 46, 50 and 58 and for the mirror 54. Three cone-pointed screws 134 mate with locators 134a (FIG. 12) during setup. A clearance hole 136 is provided for a single screw 137 which is threaded into measuring assembly 28 and secures the reflector assembly 28 to the laser assembly 26 during setup. A spring 139 and a washer 140 on the shank of screw 137 urge the reflector assembly 28 against laser measuring assembly 26, with screws 134 maintaining the desired spacing. A ball 138 and a clamp 141 are used to clamp the reflector assembly 28 to a ball ended stud 142 mounted in the probe socket.

Figure 16:
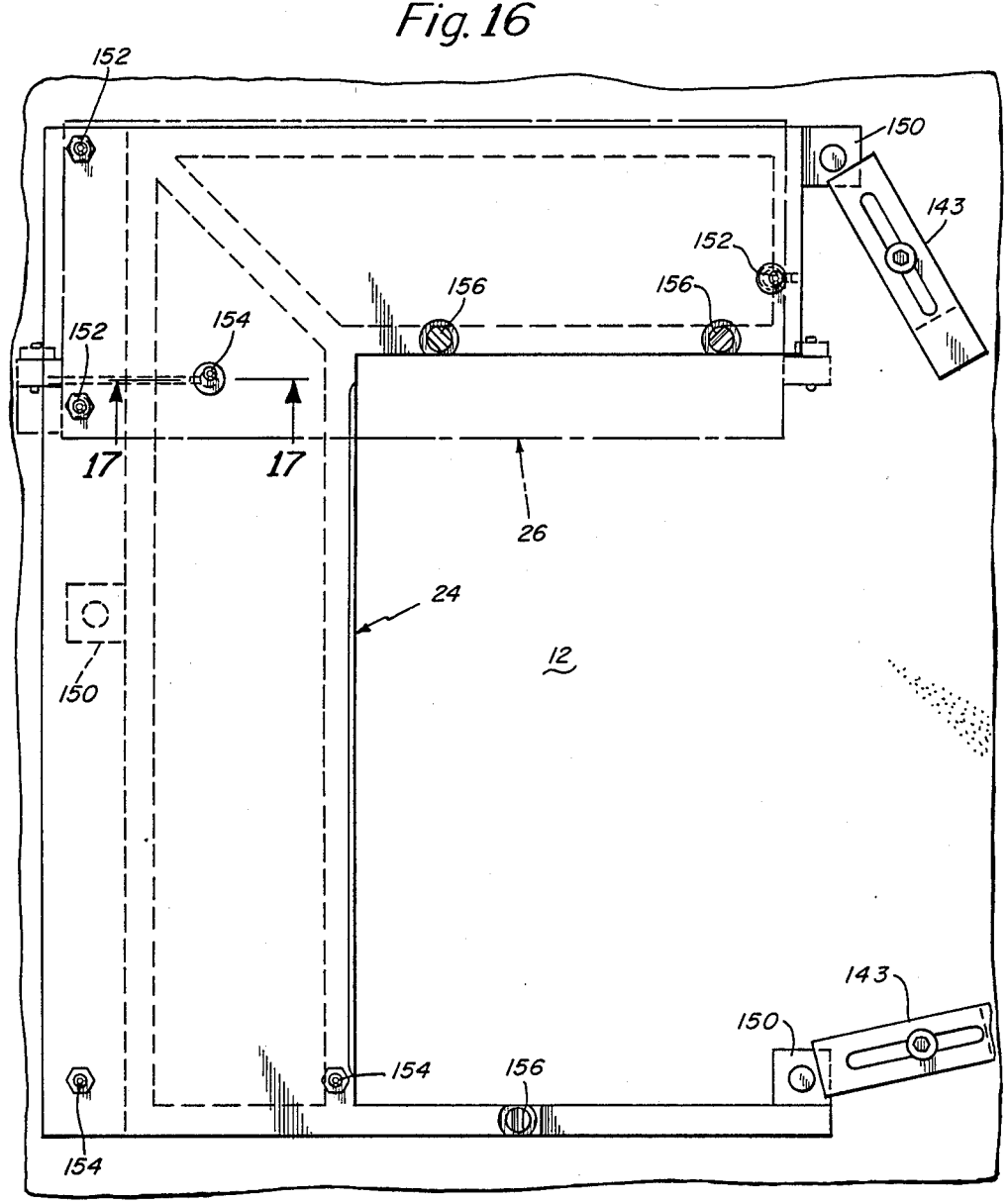
FIG. 16 is a plan view of the fixture on which the laser measuring assembly is mounted taken along the line 16—16 of FIG. 10.

A plan view of the fixture 24 is shown in FIG. 16. It comprises a three-sided frame that is rigidly mounted to the table 12 and which provides means for mounting the measuring assembly 26 in three mutually orthogonal orientations (see FIGS. 2-4). The mounting fixture 24 is placed directly on the machine table 12 and is secured with standard tooling clamps 143. The clamps 143 are secured by means of threaded inserts in the table 12. With reference to FIGS. 10 and 16, feet 150 of fixture 24 are clamped to table 12. Three mounting pins 152 are used for mounting laser measuring assembly 26 in the x direction, three mounting pins 154 are used for mounting laser measuring assembly 26 in the y direction and three locators 156 are used for mounting laser assembly 26 in the z direction. Locators 152a on the bottom of laser measuring assembly 26 (FIG. 13) mate with pins 152 during x direction mounting and mate with pins 154 during y direction mounting. For z direction mounting, the laser measuring assembly includes pins 156a (FIG. 12) which mate with locators 156. Two of the pins 156a are mounted on an upstanding arm 144 attached to the side of housing 130.

Figure 17:
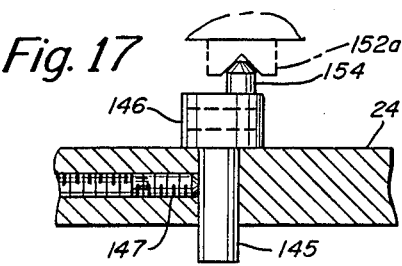
FIG. 17 is an enlarged view, partly in cross-section, of an eccentric cam for alignment of the laser measuring assembly.

An eccentric cam for alignment of the laser measuring assembly 26 is illustrated in FIG. 17. A pin 145 is inserted in fixture 24 with sufficient clearance to permit rotation. A collar 146 is attached to the upper end of pin 145 and pin 154 is offset from the center of collar 146. As collar 146 is rotated, pin 154 moves in a circle to permit fine adjustment of the laser measuring assembly 26 position. The eccentric cam arrangement can be held in fixed position by a set screw 147 after adjustment. Typically, only one of the three mounting pins utilizes the eccentric cam arrangement of FIG. 17.

Figure 15:
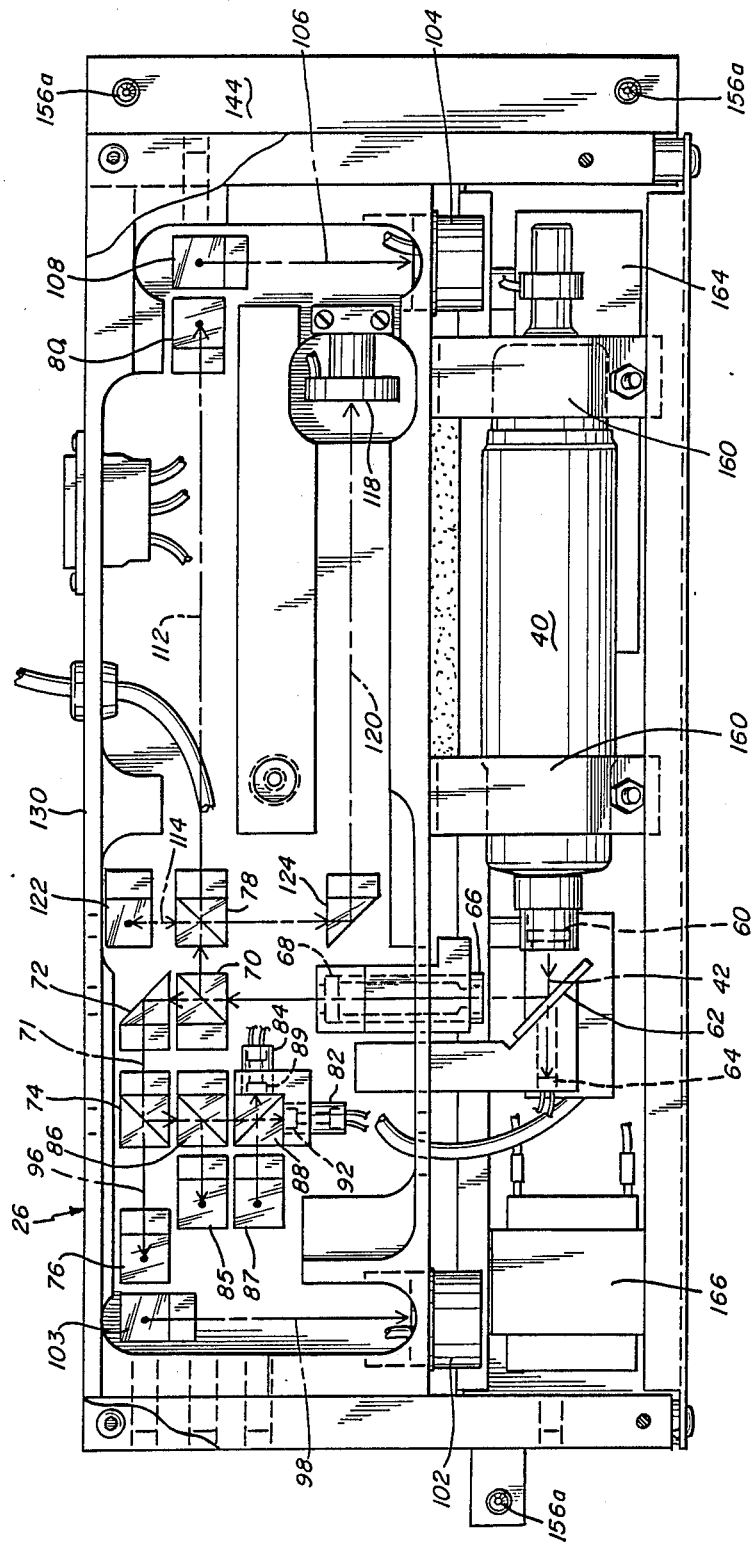
FIG. 15 is a rear elevation view of the laser measuring assembly taken along the line 15—15 of FIG. 14 and cut away to illustrate the interior elements.

The arrangement of elements within the laser measuring assembly 26 is illustrated in FIGS. 13-15. The placement of the optical elements shown in FIG. 5 is illustrated in FIG. 15 by like reference numerals. The laser 40 is mounted by means of brackets 160 and springs 162. A laser power supply 164 provides the necessary operating voltages to laser 40. A transformer 166 supplies power for the laser heaters as discussed hereinabove. The transformer 166 has two output voltages connected to solid state relays 168 and 170, respectively (FIG. 13). The relays 168, 170 switch power from the transformer 166 to the laser heaters under control of computer 30. The higher voltage is used for fast warm-up. The lower voltage is used for cavity length control. With reference to FIG. 14, prism 122, which directs beam 114 at the reflector assembly 28, is attached to housing 130 by means of a bezel 168. The prisms 108, 80, 76, 103, 85 and 87 are mounted in the same manner. Thus, there is provided a rugged and compact laser measuring assembly 26 well adapted for movement between different measurement positions.

It will be understood that various changes and modifications can be incorporated into the calibration system. For example, while the calibration system has been described with reference to a bridge-type coordinate measuring machine which utilizes a fixed table and a ram movable in three dimensions, the calibration system is equally applicable to any machine having two elements which are movable relative to each other. Either or both machine elements can be movable. For example, some types of coordinate measuring machines utilize a movable table. Furthermore, the reflector assembly 28 is described as having only reflective elements, and all sensing elements are located in the laser measuring assembly 26. The calibration system can be modified so that one or more of the sensing elements are located on the reflector assembly 28. For example, the straightness measuring photodetectors can be placed on the reflector assembly 28. The drawback to this configuration is that electrical connections must be made to the reflector assembly which in most cases is movable. Where all laser beams are reflected by the reflector assembly 28, no electrical connections are required. A further variation is to mount the laser in a fixed position and to provide a movable assembly to direct the beam from the laser along the three measurement axes. A further variation is to use prior art interferometric means to measure pitch, yaw, straightness and roll.

The output signals from photosensors 82, 84, 102, 104 and 118 are supplied through appropriate signal conditioning circuitry to computer 30 for calculation and storage of parametric errors.

In calculating the total error at an arbitrary point in the measuring volume of the coordinate measuring machine, the following notation is used. In this case, the machine components are assumed to be rigid bodies.

$D_{ij}$ = a translational position error,
$A_{ik}$ = angular position error,
$P_m$ = component of distance from the probe reference point to the probe tip,
$e_i$ = axial component of total error at the probe tip,
where i = x, y or z = the axis relative to which the position error is measured,
j = x, y or z = the axial direction of the error,
k = x, y or z = the axis about which the rotational error is measured, and
m = x, y or z = the direction of the distance component.

Thus, for example, $D_{yz}$ is the vertical (z direction) straightness measured along the y direction, while $A_{yy}$ is the roll about the y direction measured along the y direction.

Rather than using the conventional approach of attaching the axis system to each component and writing equations for transformations between the axis systems, we use a simpler approach. The simple approach is to determine error component due to each parameter, then add components for each axial direction. The simple approach is adequate because the primary errors are small, and the secondary (cosine) errors are therefore negligible. The errors for a point X, Y, Z in a bridge type machine as shown in FIG. 1 are tabulated in accordance with this approach in Table 1. The rotations are about the machine axes rather than the guideways.

TABLE 1

| Description | X Effect | Y Effect | Z Effect |
|---|---|---|---|
| Error in scale measurement of bridge travel | 0 | $D_{yy}$ | 0 |
| Horizontal straightness of bridge motion | $-D_{yx}$ | 0 | 0 |
| Vertical straightness of bridge motion | 0 | 0 | $-D_{yz}$ |
| Bridge rotation about vertical axis | $P_y \cdot A_{yz}$ | $-(x + P_x)A_{yz}$ | 0 |
| Bridge rotation about x axis | 0 | $(Z + P_z)A_{yx}$ | $-P_y \cdot A_{yx}$ |
| Bridge rotation about y axis | $-(Z + P_z)A_{yy}$ | 0 | $(x + P_x)A_{yy}$ |
| Error in scale measurement of carriage travel | $D_{xx}$ | 0 | 0 |
| Horizontal straightness of carriage motion | 0 | $-D_{xy}$ | 0 |
| Vertical straightness of carriage motion | 0 | 0 | $-D_{xz}$ |
| Carriage rotation about vertical axis | $P_y \cdot A_{xz}$ | $-P_x \cdot A_{xz}$ | 0 |
| Carriage rotation about y axis | $-(Z + P_z)A_{xy}$ | 0 | $P_x \cdot A_{xy}$ |
| Carriage rotation about x axis | 0 | $(Z + P_z)A_{xx}$ | $-P_y \cdot A_{xx}$ |
| Error in scale measurement of ram motion | 0 | 0 | $D_{zz}$ |
| y straightness of ram motion | 0 | $-D_{zy}$ | 0 |
| x straightness | $-D_{zx}$ | 0 | 0 |

TABLE 1-continued

| Description | X Effect | Y Effect | Z Effect |
|---|---|---|---|
| of ram motion | | | |
| Ram rotation about y axis | $-Pz \cdot Azy$ | 0 | $Px \cdot Azy$ |
| Ram rotation about x axis | 0 | $Pz \cdot Azx$ | $-Py \cdot Azx$ |
| Ram rotation about z axis | $Py \cdot Azz$ | $-Px \cdot Azz$ | 0 |

Columns of the table are added to find total errors.

$ex = Dxx - Dyx - Dzx - (Z + Pz)Axy + Py \cdot Axz - (Z + Pz)Ayy + Py \cdot Ayz - Pz \cdot Azy + Py \cdot Azz$ $ey = Dyy - Dzy - Dxy - (X + Px)Ayz + (Z + Pz)Ayx - Px \cdot Azz + Pz \cdot Azx - Px \cdot Axz + (Z + Pz)Axx$ $ez = Dzz - Dxz - Dyz - Py \cdot Azx + Px \cdot Azy - Py \cdot Axx + Px \cdot Axy - Py \cdot Ayx + (X + Px)Ayy$ To correct machine errors, ex is subtracted from the X scale reading, ey is subtracted from the Y scale reading and ez is subtracted from the Z scale reading. The above error values are for a machine having components that are assumed to be rigid bodies.

Generally, it is impossible or impractical to measure parametric errors directly along the machine axes. Where measurements are made along other axial direction lines, the following equations are used to calculate parametric errors along the machine axes. Ground rules for deriving the equations are that all parametric errors are zero at the origin and that all measured values are zero at the zero travel position on a measurement line. In transferring the values measured by the calibration system to the machine axes, the following notation is used:

B** = a distance or angle measured during machine calibration. The first asterisk is replaced by x, y or z to denote the measurement line and the second asterisk is replaced by d, h, v, y, p or r to denote the kind of measurement.

"d" denotes a linear displacement measurement.

"h" denotes a horizontal straightness measurement. For the z axis, h denotes the x direction.

"v" denotes a vertical straightness measurement. For the z axis, v denotes the y direction.

"y" denotes a yaw measurement. For the x and y axes, yaw is an angular rotation about a vertical axis. For the z axis, it is an angular rotation about the y axis.

"p" denotes a pitch measurement. For x and y, pitch is an angular rotation about a horizontal line perpendicular to the measurement line. For z, it is an angular rotation about the x axis.

"r" denotes an auxiliary straightness measurement for determination of roll. For the x and y axes, the measurement is vertical. For the z axis, the measurement is in the y direction.

P** = a component of distance from the probe reference point to the measurement point (such as the vertex of the retroreflector) in an error measurement. The first asterisk is replaced by x, y or z to denote the measurement line. The second asterisk is replaced by x, y or z to denote the direction of the component.

O* = a coordinate of a line used for measurements. The line defined by two such coordinates is the nominal path of the probe reference point during a set of measurements. The asterisk is replaced by x, y or z to denote the direction of the coordinate.

C = the component of distance between the two straightness measuring lines in a roll measurement. Utilizing the above notation, the values of displacement errors Dij and rotation errors Aik are calculated as follows.

$Axx = (Bxr - Bxv)/C$
$Axy = Bxp$
$Axz = Bxy$
$Ayx = Byp$
$Ayy = (Byv - Byr)/C$
$Ayz = Byy$
$Azx = Bzp$
$Azy = Bzy$
$Azz = (Bzr - Bzv)/C$
$Dxx = X - Bxd + (Oz + Pxz)Axy - Pxy \cdot Axz$
$Dxy = Bxh - X \, Ayz - Pxx \cdot Axz + (Oz + Pxz)Axx$
$Dxz = Bxv - Pxy \cdot Axx + Pxx \cdot Axy + X \cdot Ayy$
$Dyx = Byh - (Oz + Pyz)Ayy + Pyy \cdot Ayz$
$Dyy = Y - Byd + (Ox + Pyx)Ayz - (Oz + Pyz)Ayx$
$Dyz = Byv - Pyy \cdot Ayx + (Ox + Pyx)Ayy$
$Dzx = Bzh - Z \cdot Axy - Z \cdot Ayy - Pzz \cdot Azy + Pzy \cdot Azz$
$Dzy = Bzv + Z \cdot Ayx - Pzx \cdot Azz + Pzz \cdot Azx + Z \cdot Axx$
$Dzz = Z - Bzd + Pzy \cdot Azx - Pzx \cdot Azy.$ Thus far, the discussion and calculation of error parameters has assumed that the components of the coordinate measuring machine are rigid bodies not subject to deflection or deformation as the probe is moved from point to point in the measuring volume. In accordance with the present invention, there is provided a method for determining error parameters for correction of the scale readings of a coordinate measuring machine having one or more nonrigid components that undergo deflection or deformation as the probe is moved in specified directions. The error parameters include both nonrigid error parameters, which include the effects of machine deflection, and rigid error parameters wherein machine deflection is not a factor. Rigid error parameters are defined as those error parameters that vary only as a function of probe position along the prescribed measurement direction. Nonrigid error parameters are defined as those that vary as a function of probe position along the prescribed measurement direction and also as a function of probe position along a second direction perpendicular to the measurement direction.

The measurement of rigid error parameters has been described hereinabove. The nonrigid error parameters could be determined by defining a two-dimensional or a three-dimensional grid and measuring the error parameters at each grid intersection. However, the quantity of data would be impractically large. The identification and measurement of nonrigid error parameters will be illustrated with reference to a bridge coordinate measuring machine, as shown in FIG. 1.

It will be understood that many error parameters are a function of probe position only along the prescribed measurement axis, so that it is not necessary to correct for machine deflection in all directions. For example, in a bridge machine, only the error parameters measured along the y-direction are nonrigid. Error parameters in the x and z directions are treated as rigid.

First, consider movement of the ram 20 with the probe 22 attached to its lower end. As the ram 20 is moved to different z positions, forces on the ram guideway are the same regardless of the x, y position at which the measurement is made. Therefore, it can be assumed that the ram 20 exhibits rigid behavior.

Next, consider movement of the carriage 18 in the x direction along the bridge 14. Forces exerted by the ram 20 and the carriage 18 on the x guideway are the same for all ram positions. If there are no redundant bridge support bearings, support forces exerted on the bridge 14 by the y guideways are the same for all bridge positions. Therefore, it can be assumed that the carriage 18 also exhibits rigid behavior.

In considering the movement of the bridge 14 along the y guideways, the situation is quite different. Loading on the y guideways depends both on where the bridge 14 is located and where the carriage 18 is located. Therefore, the machine elements are assumed to exhibit nonrigid behavior as the bridge 14 is moved in the y direction.

For nonrigid behavior of the bridge machine in the y direction, it has been discovered that each rotational deflection correction is the product of a complicated function of y and a simple function of x. The approach is to tabulate the function of y and state the function of x in mathematical form. When the x carriage is locked and the bridge 14 is moved in the y direction, the errors are complicated because of imperfections in the y guideways and the supports for the y guideways. When the bridge 14 is locked and the carriage 18 is moved in the x direction, the errors are relatively simple. The y guideways deflect by an amount that depends on the x position of the carraige 18. Vertical forces exerted on the y guideways by the bridge 14 are calculated from the equations of classical statics. The equations are linear functions of the x position of the carriage 18. As a first approximation for a given y position, deflections of the y guideways are proportional to forces applied by the bridge 14. Therefore, the forces are also linear functions of the x position of carriage 18. Rotation of the bridge 14 about a y direction line is a function of guideway deflections and is therefore a linear function of x.

In the case of nonrigid error parameters, measurement along a single measurement line is insufficient to fully define the error parameter, since the parameter varies with probe position in a direction perpendicular to the measuring direction. In accordance with the method of the present invention, the first step after the nonrigid error parameters are identified is to establish a mathematical relationship between the value of the error parameter and the position of the probe along the direction perpendicular to the measurement direction. For example, y-direction parameters may be defined as a function of probe position in the x direction. The mathematical relationship includes n unknown coefficients. A separate mathematical relationship is determined for each nonrigid error parameter.

For a given y position, loads on the y guideways are assumed to be a linear function of the x position of the x carriage. For the case where deflections obey Hooke's Law, guideway deflections are also linear functions of the x position of the carriage 18. Therefore, roll is a linear function of the x position and can be defined as:

$$Roll = A + Bx \quad (1)$$

where A and B are the unknown coefficients and x is the distance from the y-axis to the probe reference point. The probe reference point is an imaginary point located at the center of the probe. The probe reference point is fixed in position relative to ram 20, whether or not the probe is mounted on the ram 20. When roll is a linear function of x, there are two unknown coefficients. For cases where the deflections do not obey Hooke's Law, the relationship is not necessarily linear and is likely to be more complex. For example, $$Roll = A + Bx + Cx^2, \quad (2)$$

where C is a third unknown coefficient.

For the moving bridge machine shown in FIG. 1, y direction pitch, linear displacement error, vertical straightness and horizontal straightness also exhibit nonrigid behavior and are dependent on x probe position. Y direction yaw exhibits rigid behavior. The x and y axes exhibit rigid behavior because vertical motion of the z ram does not affect loading, and the bridge shape is the same for all y positions. A mathematical expression is developed for each parameter exhibiting nonrigid behavior in the same manner as illustrated for y roll. A linear relationship is adequate in most cases. Thus, a generalization of equation (1) gives $$\text{Nonrigid error parameter} = A + Bx \quad (3)$$

In the next major step of the calibration procedure, error parameters are measured. As described above, the full set of error parameters is divided into those exhibiting rigid behavior and those exhibiting nonrigid behavior. For error parameters exhibiting rigid behavior, values of the error parameters are measured along a single measurement line that is parallel to the prescribed measurement direction. In the case of the moving bridge machine, the error parameters in the x and z directions exhibit rigid behavior, as described above. Measurement of rigid error parameters along a single measurement line has been described hereinabove.

For error parameters that exhibit nonrigid behavior, sets of error parameters are measured along two or more spaced-apart measurement lines that are parallel to the measurement direction. The number of measurement lines corresponds to the number of unknown coefficients in the mathematical expressions developed above for the error parameters. In the case of linear equations for error parameters, two measurement lines are required. In the case of nonlinear equations for error parameters, three or more measurement lines are required.

The required error parameter measurements are preferably performed with the calibration system shown and described herein. The mounting fixture 24 is mounted in a fixed position on the table 12. The laser measuring assembly 26 is attached to the mounting fixture with the required orientation, and, after removal of the probe 22 from the ram 20, the reflector assembly 28 is attached to the ram 20 in a corresponding orientation. The ram 20 is then moved along the measurement line to a number of measurement points, and the error parameters are measured at each point.

The determination of nonrigid error parameters in accordance with the method of the present invention is not limited to use of the apparatus described herein. The measurements can be made with the system described in Hewlett-Packard Laser Measurement System Application Note No. 156-4 or any other system having suitable measuring capabilites.

Figure 18A:
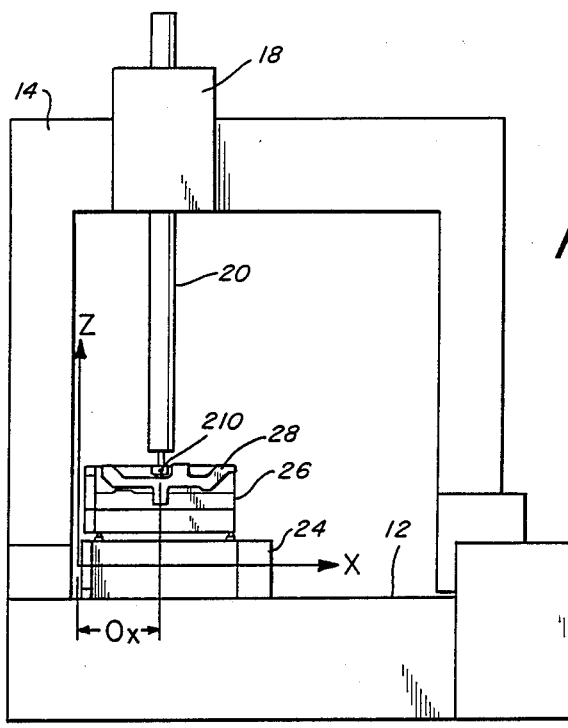
FIGS. 18A and 18B are simplified schematic diagrams of a bridge coordinate measuring machine illustrating error parameter measurement along two parallel, spaced apart measurement lines.
Figure 18B:
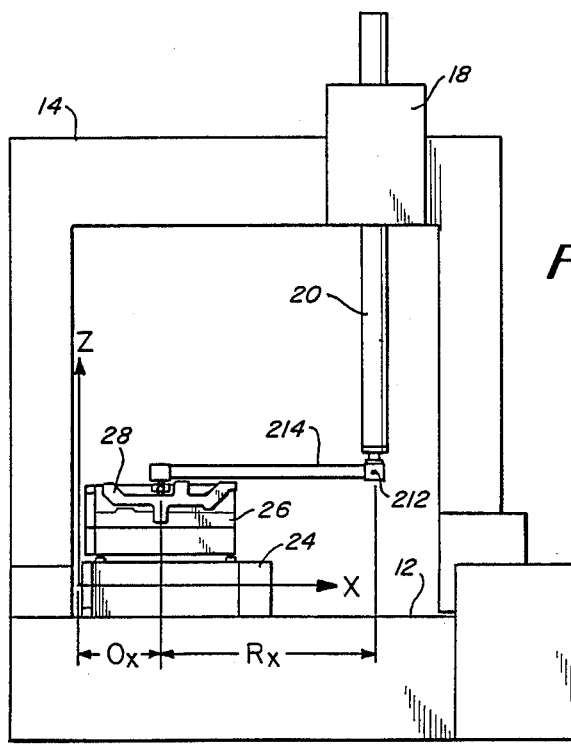
Figure 19:
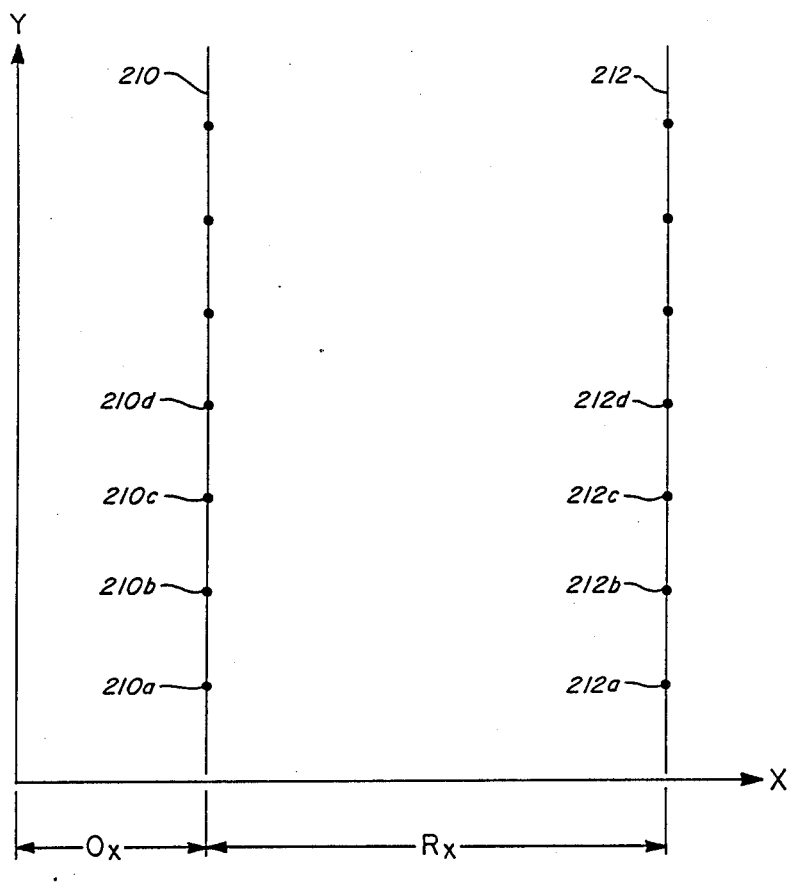
FIG. 19 is a schematic diagram illustrating measurement of nonrigid error parameters along two spaced-apart measurement lines.

For error parameters exhibiting nonrigid behavior, measurements are made as illustrated in FIGS. 18A, 18B and 19. The reflector assembly 28 is attached directly to the ram 20, as shown in FIGS. 18A and 19, and error parameters are measured with the probe reference point moved to a number of points along a first measurement line 210. The measurement line 210 is parallel to the y axis and is spaced from the y axis by a distance Ox. The bridge 14, the ram 20 and the reflector assembly 28 are moved along measurement line 210 in the y direction, and error measurements are made at points 210a, 210b, 210c, 210d, etc. along line 210. When the measurements along line 210 have been completed, the carriage 18 is displaced in the x direction by a distance Rx so that the probe reference points falls on a second measurement line 212, as shown in FIGS. 18B and 19. The second measurement line 212 is parallel to the first measurement line 210, and to the y axis, and is spaced from the first measurement line 210 by distance Rx. The reflector assembly 28 is detached from ram 20, and an offset arm 214 is attached to the lower end of ram 20. The offset arm 214 provides means for positioning the reflector assembly 28 in alignment with laser measuring assembly 26 when the probe reference point is displaced to measuring line 212. The offset arm 214 permits error measurements along two parallel, spaced-apart lines without moving the laser measuring assembly 26. The distance Rx is established by the offset arm 214. It will be understood that different offset arms can be used to establish different offset distances.

Next, error measurements are taken along measurement line 212 at successive, spaced-apart points 212a, 212b, 212c, 212d, etc. For reasons described hereinafter, error measurements are taken along lines 210 and 212 at corresponding pairs of points such that each member of the pair has the same y coordinate. With reference to FIG. 19, points 210a and 212a form a first pair having the same y coordinate, points 210b and 212b form a second pair having the same y coordinate, etc. Each pair of measurement points having the same y coordinate defines a line parallel to the x axis. In a case where three or more measurement lines are required, measurements are taken at corresponding values of y along additional measurement lines.

After the errors have been measured at corresponding pairs of points along measurement lines 210 and 212, the measured values are used to determine the unknown coefficients in the mathematical equations for each error parameter. Referring again to the equation (1) above for roll, in terms of coefficients A and B, now assume that a value of roll E210a was measured at point 210a, and a value of roll E212a was measured at point 212a. The measured values of the error and the corresponding x positions are substituted into equation (1) as indicated in equations (4) and (5) below.

$$E210a = A + BOx \quad (4)$$

$$E212a = A + B(Ox + Rx) \quad (5)$$

The simultaneous equations have two unknown coefficients (A and B). The simultaneous equations are solved to provide $$A = E210a - Ox(E212a - E210a)/Rx \quad (6)$$

$$B = (E212a - E210a)/Rx \quad (7)$$

Thus, the error measurements along lines 210 and 212 have been utilized to calculate the values of the coefficients A and B in the equation for the nonrigid error parameter at one pair of measurement points. This procedure is repeated for each pair of points (210b and 212b, 210c and 212c, etc.) along the measurement direction to provide multiple sets of coefficients.

In the same manner, the coefficients are calculated for all other nonrigid error parameters. The sets of error measurements are substituted into the mathematical equations for the respective nonrigid error parameters to provide sets of simultaneous equations. The sets of simultaneous equations are solved to provide the coefficients for the error parameter equation at each pair of points along the measurement line.

The errors measured in accordance with the above procedure are used to calculate error parameters which are subsequently utilized to correct scale readings at any point in the measurement volume. Calculation of error parameters will be illustrated for the case of the bridge machine wherein the y error parameters have a linear dependence on the x position of the probe. To calculate the error parameters, the following notation is utilized. The notation corresponds to the notation described above for the rigid error parameters, except that additional terminology is introduced to account for nonrigid behavior.

B** is a distance or angle measured during machine calibration. The first asterisk is replaced by x, y, z or d to denote the measurement line; x, y or z denote the single measurement line for a rigid error parameter and denote the first measurement line (210) in a nonrigid error measurement, while d denotes the second measurement line (212) in a nonrigid error measurement. The second asterisk is replaced by d, h, v, y, p or r to denote the type of measurement, as described hereinabove in connection with measurement of rigid machines.

Dij and Aik have the same definitions as specified hereinabove in connection with the measurement of error parameters for rigid machines. Dij is a translational position error, and Aik is an angular position error. In the case of nonrigid error parameters, Dij and Aik correspond to A in equation (3).

dy* is the slope of the mathematical equation for a translational error parameter exhibiting nonrigid behavior. The asterisk is replaced by x, y or z to denote the direction of the error. The term dy* corresponds to B in equation (3) when equation (3) specifies a translational error parameter.

ay* is the slope of the mathematical equation for a rotational error parameter exhibiting nonrigid behavior. The asterisk is replaced by x, y or z to denote the axial direction about which rotation occurs. The term ay* corresponds to B in equation (3) when equation (3) specifies a rotational error parameter.

X, Y and Z are the coordinates of the probe reference point as indicated by the machine scales.

O* is the coordinate of the probe reference point when measuring a B** other than Bd*. The asterisk is replaced by x, y or z to denote the direction of the coordinate.

R* is the component of the distance from the line defined by O* to the probe reference point when measuring Bd*. The asterisk is replaced by x, y or z to denote the direction of the component.

C* is the component of the distance between the two straightness measuring lines in a roll measurement. (The distance from the measurement line for B*v to the measurement line for B*r.) The asterisk denotes the direction of the component.

P** is a component of the distance from the probe reference point to the actual measurement point (such as the vertex of a retroreflector). The first asterisk is replaced by x, y, z or d to denote the measurement line; x, y or z denote the single measurement line for a rigid error parameter and denote the first measurement line (210) in a nonrigid error measurement, while d denotes the second measurement line (212) in a nonrigid error measurement. The second asterisk is replaced by x, y or z to denote the direction of the component.

Utilizing this notation, the values of the displacement error parameters Dij, the rotation error parameters Aik, and the coefficients dy* and ay* are calculated as follows.

ayx=(Bdp−Byp)/Rx
Ayx=Byp−Ox ayx
ayy=(Bdv−Bdr−Byv+Byr)/(Rx·Cx)
Ayy=(Byv−Byr)/Cx−Ox·ayy
Ayz=Byy
Axx=(Bxr−Bxv)/Cy−X·ayx
Axy=Bxp−X·ayy
Axz=Bxy
Azx=Bzp
Azy=Bzy
Azz=(Bzr−Bzv)/Cx
dyx=(Bdh−Byh)/Rx−(Oz+Rz+Pdz)ayy+(Pdy−Pyy)Ayz/Rx
Dyx=Byh(1+Ox/Rx)  Ox·Bdh/Rx−(Oz+Pyz)Ayy+Pyy·Ayz−Ox(Pdy−Pyy)Ayz/Rx
dyy=(Bdd−Byd)/Rx−(Oz+Pdz)ayx−Rz·ayx
Dyy=Byd(1+Ox/Rx)−Ox·Bdd/Rx+(Ox+Pyx)Ayz−(Oz+Pyz)Ayx
dyz=(Bdv−Byv)/Rx−Pdy·ayx−(Pdy−Pyy)(Ayx+Ox ayx)/Rx+(Ox+Pyx)ayy
Dyz=Byv(1+Ox/Rx)−Ox·Bdv/Rx+Ox(Pdy−Pyy)(1+Ox/Rx)ayx+Ox(Pdy−Pyy)Ayx/Rx−Pyy Ayx+(Ox+Pyx)Ayy
Dxx=Bxd+X·dyx+(Oz+Pxz)Axy−Pxy Axz+(Oz+Pxz)X·ayy
Dxy=Bxh+X·dyy−X·Ayz+(Oz+Pxz)X·ayx−Pxx·Axz+(Oz+Pxz)Axx
Dxz=Bxv−X·dyz−Pxy Axx+Pxx·Axy−Pxy·X·ayx+X(Ayy+X ayy)+Pxx X·ayy
Dzx=Bzh−Z·Axy−Z(Ayy+Ox ayy) Pzz·Azy+Pzy·Azz
Dzy=Bzv+Z(Ayx+Ox·ayx)−Pzx·Azz+Pzz·Azx+Z·Axx
Dzz=Bzd+Pzy·Azx−Pzx−Pzx·Azy From the above error parameters, the axial errors at any point in the working volume of the machine can be calculated. The axial component of the total error at the probe tip is denoted by ei, and P* is the component of distance from the probe reference point to the probe tip. The term P* is necessary for cases where the probe tip is offset from the probe reference point. The axial error equations are as follows.

ex=Dxx−Dyx−X·dyx−Dzx−(Z+Pz)Axy+Py·Axz−(Z+Pz)(Ayy+X·ayy)+Py·Ayz−Pz·Azy+Py·Azz
ey=Dyy+X·dyy−Dzy−Dxy−(X+Px)Ayz+(Z+Pz)(Ayx+X·ayx)−Px·Azz+Pz·Azx−Px·Axz+(Z+Pz)Axx
ez=Dzz−Dxz−Dyz−X·dyz Py·Azx+Px·Azy−Py·Axx+Px·Axy−Py(Ayx+X·ayx)+(X+Px)(Ayy+X·ayy)

When a workpiece is measured, the above axial errors are subtracted from the machine scale readings as corrections to provide a highly accurate position reading.

While there has been shown and described what is at present considered the preferred embodiments of the present invention, it will be obvious to those skilled in the art that various changes and modifications may be made therein without departing from the scope of the invention as defined by the appended claims.

What is claimed is:

1. In a coordinate measuring machine including a first element and a second element, said first element being movable relative to said second element, said coordinate measuring machine further including scales for monitoring the position of the first element relative to the second element and providing scale readings, and computer means for storing said scale readings, said coordinate measuring machine being subject to errors in said scale readings, said errors being characterized by a set of error parameters including rigid error parameters which are a function only of relative position along an associated measurement direction and nonrigid error parameters which are a function of relative position along an associated measurement direction and of relative position along a second direction, a method for providing corrected scale readings of a workpiece, comprising the steps of:

measuring each of said rigid error parameters at point along a line that is parallel to the measurement direction, the step of measuring each of said rigid error parameters being performed by a calibration apparatus;

measuring each of said nonrigid error parameters at corresponding sets of n points along n spaced-apart lines that are parallel to the measurement direction, each set of n points lying on a line parallel to said second direction to provide sets of nonrigid errors parameter measurements, the step of measuring each of said nonrigid error parameters being performed by said calibration apparatus;

substituting each of said sets of nonrigid error parameter measurements and corresponding first element positions into n simultaneous equations having n coefficients, said equations describing the relationship between said nonrigid error parameters and the position of the first element along said second direction, the step of substituting each of the sets of nonrigid error parameter measurements and corresponding first element positions being performed by said computer means;

for each of said sets of nonrigid error parameter measurements, solving the associated n simultaneous equations for said n coefficients, the step of solving the associated n simultaneous equations being performed by said computer means;

measuring a workpiece by bringing said first element into contact with the workpiece and storing scale readings in said computer means; and using said rigid error parameters and said sets of n coefficients to correct said scale readings and provide corrected scale readings of the workpiece, the step of correcting said scale readings being performed by said computer means.

2. A method as defined in claim 1 wherein the step of using said rigid error parameters and said sets of n coefficients to correct said scale readings and provide corrected scale readings of the workpiece includes the steps of calculating said errors from said rigid error parameters and said sets of n coefficients, and subtracting said errors from said scale readings, said steps of calculating and subtracting being performed by said computer means.

3. A method as defined in claim 1 wherein the step of measuring each of said nonrigid error parameters includes the step of measuring each of said nonrigid error parameters at corresponding pairs of points along two spaced-apart lines parallel to the measurement direction.

4. A method as defined in claim 3 wherein the step of measuring each of said nonrigid error parameters at corresponding pairs of points along two spaced-apart lines parallel to to measurement direction includes the steps of
  positioning the first element at a plurality of points along a first line parallel to the measurement direction and measuring the nonrigid error parameter at each such point,
  shifting the first element in the second direction to a second line parallel to the measurement direction, and
  positioning the first element at a like plurality of points along the second line and measuring the nonrigid error parameter at each such point.

5. A method as defined in claim 1 wherein the step of measuring each of said nonrigid error parameters includes the steps of attaching a first measuring device of said calibration apparatus to the first element, attaching a second measuring device of said calibration apparatus to the second element and directing at least one laser beam between the first and second measuring devices for determining the position of the first element relative to the second element.

6. A method as defined in claim 5 wherein the step of measuring each of said nonrigid error parameters further includes the step of offsetting the first measuring device from the first element during measurement of the nonrigid error parameters along one of said lines.

7. In a coordinate measuring machine including a first element and a second element, said first element being movable relative to said second element, said coordinate measuring machine further including scales for monitoring the position of the first element relative to the second element and providing scale readings, and computer means for storing said scale readings, said coordinate measuring machine being subject to errors in said scale readings, said errors being characterized by a set of error parameters including rigid error parameters which are a function only of relative position along an associated measurement direction and nonrigid error parameters which are a function of relative position along an associated measurement direction and of relative position along a second direction, a method for providing corrected scale readings of a workpiece, comprising the steps of:
  measuring each of said rigid error parameters at points along a line that is parallel to the measurement direction, the step of measuring each of said rigid error parameters being performed by a calibration apparatus;
  measuring each of said nonrigid error parameters at corresponding sets of n points along n spaced-apart lines that are parallel to the measurement direction, each set of n points lying on a line parallel to said second direction to provide sets of nonrigid error parameter measurements, the step of measuring each of said nonrigid error parameters being performed by said calibration apparatus;
  measuring a workpiece by bringing said first element into contact with the workpiece and storing scale readings in said computer means; and
  using said rigid error parameters and said nonrigid error parameter measurements to correct said scale readings and provide corrected scale readings of the workpiece, the step of correcting said scale readings being performed by said computer means.

8. A method as defined in claim 7 wherein the step of measuring each of said nonrigid error parameters includes the step of measuring each of said nonrigid error parameters at corresponding pairs of points along two spaced-apart lines parallel to the measurement direction.

9. A method as defined in claim 8 wherein the step of measuring each of said nonrigid error parameters at corresponding pairs of points along two spaced-apart lines parallel to the measurement direction includes the steps of
  positioning the first element at a plurality of points along a first line parallel to the measurement direction and measuring the nonrigid error parameter at each such point,
  shifting the first element in the second direction to a second line parallel to the measurement direction, and
  positioning the first element at a like plurality of points along the second line and measuring the nonrigid error parameter at each such point.

10. A method as defined in claim 7 wherein the step of measuring each of said nonrigid error parameters includes the steps of attaching a first measuring device of said calibration apparatus to the first element, attaching a second measuring device of said calibration apparatus to the second element and directing at least one laser beam between the first and second measuring devices for determining the position of the first element relative to the second element.

11. A method as defined in claim 10 wherein the step of measuring each of said nonrigid error parameters further includes the step of offsetting the first measuring device from the first element during measurement of the nonrigid error parameters along one of said lines.

* * * * *